(12) United States Patent
Choudhary et al.

(10) Patent No.: US 12,373,093 B2
(45) Date of Patent: Jul. 29, 2025

(54) METHOD AND ELECTRONIC DEVICE FOR PROVIDING CONTROL FUNCTIONALITY OF DISPLAY

(71) Applicant: SAMSUNG ELECTRONICS CO., LTD., Suwon-si (KR)

(72) Inventors: Choice Choudhary, Noida Uttar Pradesh (IN); Ankit Agarwal, Noida Uttar Pradesh (IN); Shivam Singh Rajput, Noida Uttar Pradesh (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/217,229

(22) Filed: Jun. 30, 2023

(65) Prior Publication Data

US 2023/0342022 A1 Oct. 26, 2023

Related U.S. Application Data

(63) Continuation of application No. PCT/KR2023/000193, filed on Jan. 5, 2023.

(30) Foreign Application Priority Data

Jan. 5, 2022 (IN) .............................. 202241000624

(51) Int. Cl.
*G06F 3/0488* (2022.01)
*G06F 3/041* (2006.01)
*G06F 3/044* (2006.01)

(52) U.S. Cl.
CPC .......... *G06F 3/0488* (2013.01); *G06F 3/0416* (2013.01); *G06F 3/044* (2013.01)

(58) Field of Classification Search
CPC ...... G06F 3/0488; G06F 3/0416; G06F 3/044; G06F 1/1694; G06F 3/04817;
(Continued)

(56) References Cited

U.S. PATENT DOCUMENTS

| 5,729,219 | A | 3/1998 | Armstrong et al. |
| 9,060,068 | B2 | 6/2015 | Lee et al. |

(Continued)

FOREIGN PATENT DOCUMENTS

| KR | 20130025555 A | 3/2013 |
| KR | 101341737 B1 | 12/2013 |

(Continued)

OTHER PUBLICATIONS

Agarwal, ios 14 lets you perform actions by tapping the back of your iphone, Perform Actions by Tapping The Back of Your Iphone on IOS 14 | Digital Trends, Jun. 22, 2020, 17 Pages. URL: https://www.digitaltrends.com/mobile/ios-14-back-tap-gesture-accessibility-update/.

(Continued)

*Primary Examiner* — Sahlu Okebato
(74) *Attorney, Agent, or Firm* — CANTOR COLBURN LLP

(57) ABSTRACT

Embodiments are directed to providing control functionality of a display of an electronic device. The method includes determining, by the electronic device, an event and partitioning, by the electronic device, a rear side of the electronic device into dynamic tiles based on multiple parameters associated with the display, based on determining the event. The method also includes detecting, by the electronic device, a user gesture on the dynamic tile on the rear side of the electronic device and classifying, by the electronic device, the detected gesture into a gesture category. Further, the method includes determining, by the electronic device, a functionality based on the gesture on the rear side of the electronic device and the corresponding gesture category. The method includes controlling, by the electronic device, the functionality on the display of the electronic device.

15 Claims, 31 Drawing Sheets

(58) Field of Classification Search
CPC ......... G06F 2203/04803; G06F 3/0485; G06F 3/04886; G06F 3/04883
See application file for complete search history.

(56) References Cited

U.S. PATENT DOCUMENTS

| | | | |
|---|---|---|---|
| 9,927,914 | B2 | 3/2018 | Kim et al. |
| 11,199,961 | B2 | 12/2021 | Rivera et al. |
| 2004/0106439 | A1 | 6/2004 | Garroch |
| 2009/0201260 | A1 | 8/2009 | Lee et al. |
| 2011/0102350 | A1 | 5/2011 | Jung |
| 2011/0157053 | A1 | 6/2011 | Webb et al. |
| 2013/0063385 | A1 | 3/2013 | Nishio |
| 2013/0342480 | A1 | 12/2013 | Moon et al. |
| 2015/0091877 | A1 | 4/2015 | Kim et al. |
| 2015/0293695 | A1* | 10/2015 | Schönleben ......... G06F 3/0412 345/173 |
| 2016/0048288 | A1* | 2/2016 | Lee ................... G06F 3/04883 455/566 |
| 2016/0048320 | A1 | 2/2016 | Han et al. |
| 2017/0269785 | A1 | 9/2017 | Abdollahian et al. |
| 2018/0181562 | A1* | 6/2018 | Sabripour ........... G06F 3/04883 |
| 2018/0225727 | A1* | 8/2018 | Das ................... G06Q 30/0281 |
| 2021/0240526 | A1* | 8/2021 | Weber ................. G06F 9/5016 |
| 2021/0333962 | A1 | 10/2021 | Abghari et al. |

FOREIGN PATENT DOCUMENTS

| | | | | |
|---|---|---|---|---|
| KR | 101467513 | B1 | 12/2014 | |
| KR | 20150001551 | U | 4/2015 | |
| KR | 20150037026 | A | 4/2015 | |
| KR | 20160047267 | A | 5/2016 | |
| KR | 102197912 | B1 | 1/2021 | |
| WO | WO-2010135133 | A1 * | 11/2010 | ........... G06F 1/1626 |
| WO | 2011077448 | A1 | 6/2011 | |

OTHER PUBLICATIONS

Gartenberg, "Apple added a secret button to your iPhone, and you may not have even noticed," Button of the Month: iOS 14's Back Tap, The Verge, Oct. 30, 2020, 8 Pages. URL: [https://www.theverge.com/21540028/apple-phone-ios-14-back-tap-hidden-secret-button-gesture].

Lucic, "update: back gesture, not front] double tap gesture may finally arrive to pixel phones with android 12", Google Pixel, Android Headlines, Feb. 19, 2021, 7 Pages. URL: [https://www.androidheadlines.com/2021/02/double-tap-gesture-pixel-phones-android-12.html].

Samsung, "Incoming call pickup issues after Samsung M30s update", Jul. 17, 2020, Powered by Khoros, 3 Pages. URL: [https://r2.community.samsung.com/t5/Galaxy-M/Incoming-call-pickup-issues-after-Samsung-M30s-update/td-b/4909871].

Samsung, "tap or Double Tap", Feb. 25, 2021, Powered By Khoros, 2 Pages. URL: [https://r2.community.samsung.com/t5/Tech-Talk/tap-or-double-tap/m-p/7311174].

Samsung, "tap tap Gestures", Feb. 7, 2021, Powered by Khoros, 5 Pages. URL: [https://r2.community.samsung.com/t5/Tech-Talk/tap-tap-Gestures/m-p/7079686].

International Search Report and Written Opinion for International Application No. PCT/KR2023/000193; International Filing Date Jan. 5, 2023; Date of Mailing Apr. 12, 2023; 4 Pages.

Examination Report (Issuance date: Feb. 12, 2025) issued by the Indian Patent Office for Indian Patent Application No. 202241000624 which was filed on Jan. 5, 2022.

Extended European Search Report (issuance date: Nov. 21, 2024) issued by the European Patent Office for European Patent Application No. 23737391.5 filed on Feb. 16, 2024.

Schmitt et al., "Predicting Tap Locations on Touch Screens in the Field Using Accelerometer and Gyroscope Sensor Readings"; pp. 637-651.

* cited by examiner

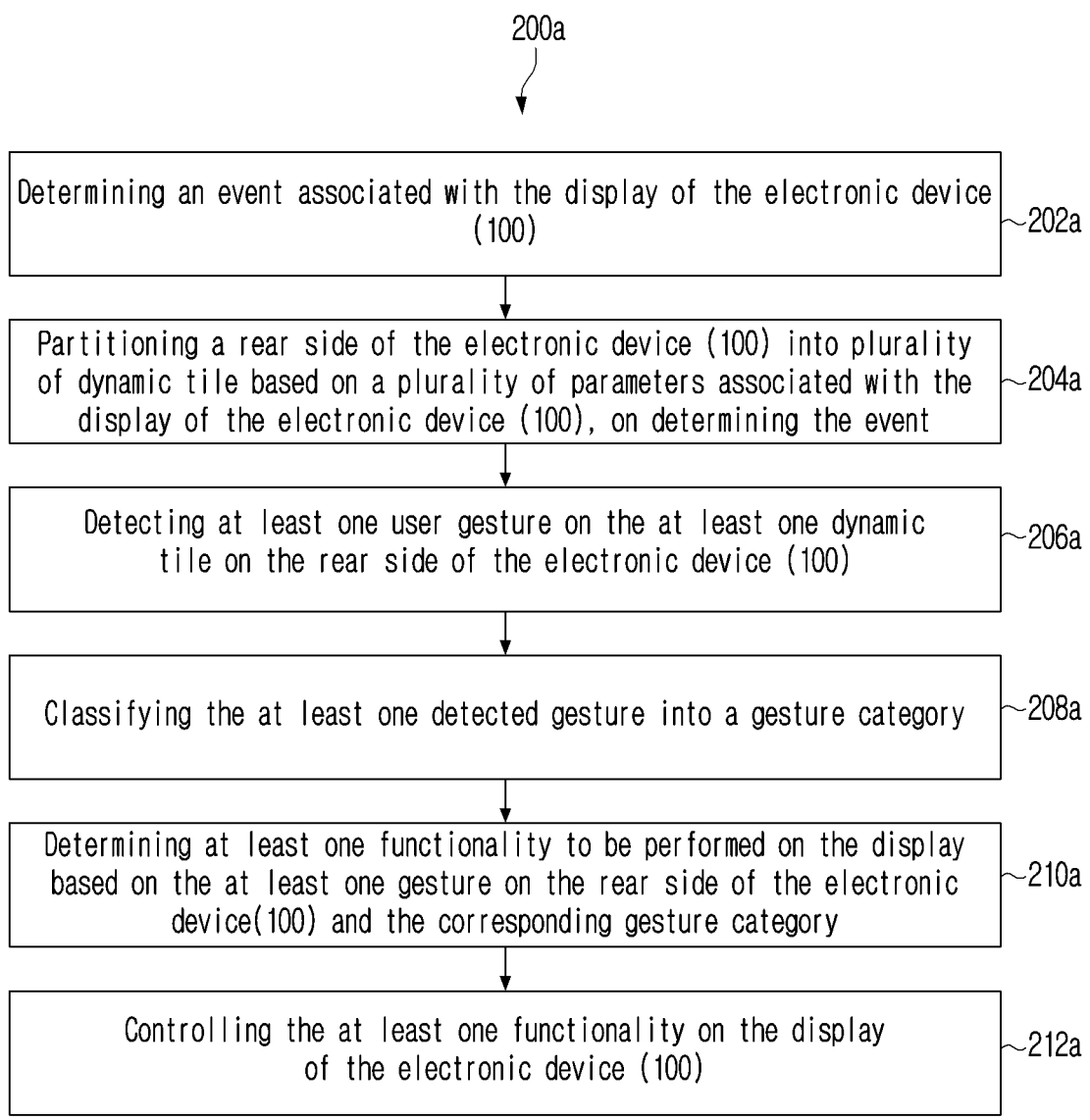

FIG. 3A

| Capacitance Change | Touch Counter | Battery Temperature (0.00 −1.00) | Touch Input | | Touch Output | | | | Activation State |
|---|---|---|---|---|---|---|---|---|---|
| | | | x | y | x | y | | | |
| Change | 1 | 0.27 | 2 | 3 | 2 | 3 | 540*960 | 30 | 1 |
| Change | 4 | 0.32 | 4 | 1 | 4 | 1 | 1600*720 | 18 | 0 |
| No change | 9 | 0.21 | 3 | 7 | - | - | 2560*1600 | 4 | 1 |
| No change | 0 | 0.13 | - | - | - | - | 2400*1080 | 12 | 0 |
| No change | 7 | 0.44 | - | - | - | - | 2560*1600 | 6 | 1 |
| Change | 2 | 0.59 | 3 | 2 | 4 | 9 | 1600*720 | 12 | 1 |
| Change | 1 | 0.35 | 1 | 5 | 1 | 6 | 540*960 | 10 | 0 |
| Change | 6 | 0.92 | 3 | 2 | - | - | 1600*720 | 28 | 1 |
| No Change | 9 | 0.74 | - | - | - | - | 2560*1600 | 6 | 1 |

FIG. 3B

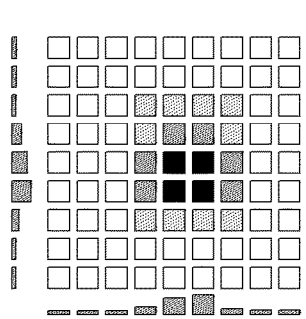
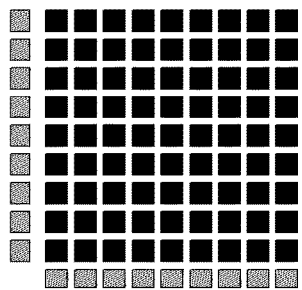

|  | Normal | In Water |
|---|---|---|
| No touch raw cap | Mutual −6~6<br>Self −8~29 | Mutual 110~159<br>Self 1251~2101 |
| No touch compensation value | Mutual −12~11<br>Self 8~27 | Mutual 213~312<br>Self 1279~2125 |
| Capacitive change during touch | Mutual 100<br>Self 190 | No Change |

Capacitance value of mutual and self data is changing in touch scenario.

Capacitance value of mutual and self data is not changing in touch scenario (water on screen).

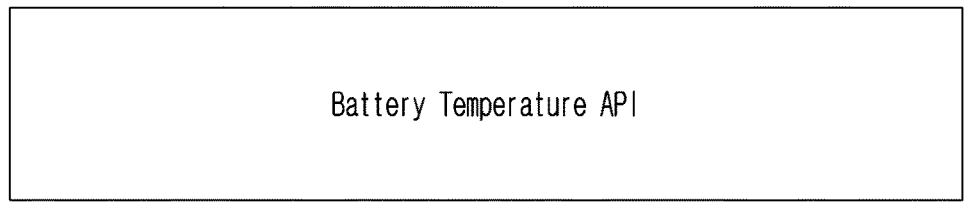

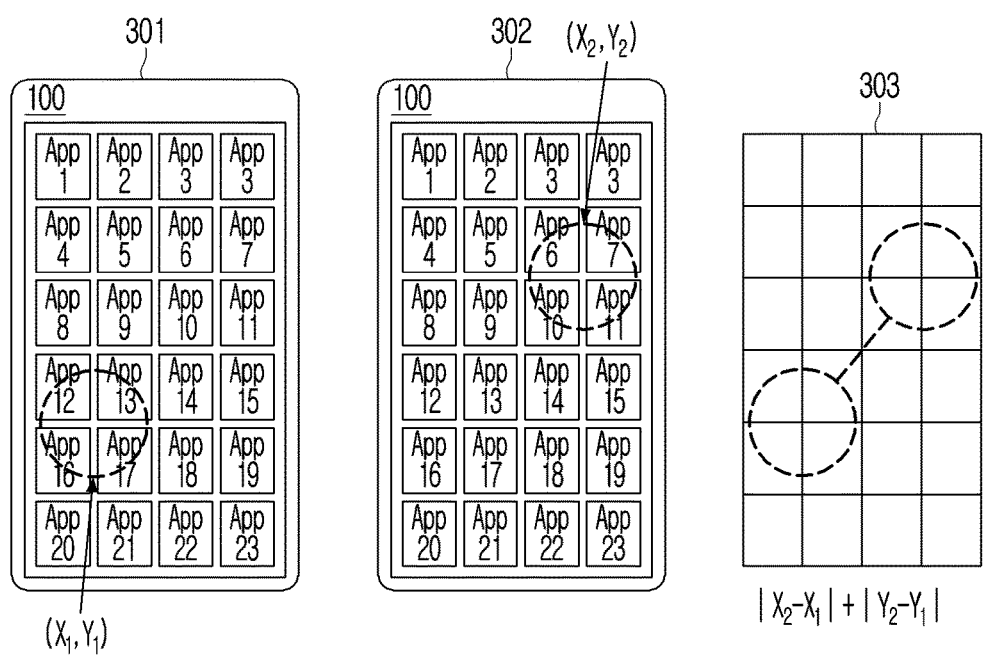

| Data | | | | | | | Root | | | | | | Mean | | RMS | | Touch Coordinate |
|---|---|---|---|---|---|---|---|---|---|---|---|---|---|---|---|---|---|
| ax | ay | az | gx | gy | gz | ax | ay | az | gx | gy | gz | acc | gyro | acc | gyro | |
| 0.4284 | 0.1461 | -0.1417 | -0.3601 | -0.0931 | -0.0970 | 0.6545 | 0.3823 | 0.3764 | 0.6001 | 0.3051 | 0.3246 | 0.1443 | -0.1834 | 0.4743 | 0.3844 | (684, 782) |
| 0.9997 | -0.1245 | 0.2465 | 0.1608 | 0.0033 | -0.0662 | 0.9999 | 0.3529 | 0.4965 | 0.4010 | 0.0571 | 0.0785 | 0.3739 | 0.0326 | 1.0372 | 0.1739 | (240, 324) |
| 0.2839 | 0.0481 | -0.2865 | -0.2238 | 0.0540 | -0.0543 | 0.5328 | 0.2192 | 0.5353 | 0.4730 | 0.2323 | 0.1123 | 0.0151 | -0.0747 | 0.4062 | 0.2365 | (112, 776) |
| 0.3247 | 0.3916 | -0.1805 | 0.2145 | 0.3227 | 0.1870 | 0.5699 | 0.6258 | 0.4249 | 0.4632 | 0.5681 | 0.1242 | 0.1786 | 0.2414 | 0.5398 | 0.4303 | (326, 1482) |
| -0.8474 | -0.2233 | 0.3406 | -0.0854 | 0.2047 | -0.0798 | 0.9205 | 0.4725 | 0.5836 | 0.2922 | 0.4525 | 0.8316 | -0.2434 | 0.0132 | 0.9402 | 0.2358 | (626, 282) |
| -0.2966 | -0.5116 | 0.2937 | -0.5105 | -0.5888 | -1.5019 | 0.5446 | 0.7152 | 0.5419 | 0.7145 | 0.7673 | 0.7314 | -0.1715 | -0.8671 | 0.6602 | 1.6920 | (224, 525) |
| -0.0301 | 0.0909 | -0.1687 | 0.5574 | -0.0515 | 0.1193 | 0.1734 | 0.3015 | 0.4107 | 0.7466 | 0.2270 | 0.3145 | -0.0360 | 0.2084 | 0.1940 | 0.5723 | (98, 1230) |
| 0.0306 | 0.1657 | -0.2062 | 0.1617 | -0.0236 | -0.0247 | 0.1749 | 0.4071 | 0.4541 | 0.4021 | 0.1537 | 0.1152 | -0.0033 | 0.0378 | 0.2663 | 0.1653 | (360, 800) |

FIG. 6A

| Time Stamp | | | | Output |
|---|---|---|---|---|
| T1 | ·······T2 | ·······T3 | ·······Tn | |
| Touch Coordinate | Touch Coordinate | Touch Coordinate | Touch Coordinate | |
| (620,40) | (618,42) | (617,40) | No coordinate Detected | Single Tap |
| (620,40) | (614,43) | (629,42) | (633,41) | Long Tap |
| (210,703) | (202,694) | (210,702) | (206,700) | Long Tap |
| (360,694) | (358,687) | (355,660) | (357,610) | Scroll |
| (89,1420) | (87,1410) | (91,1416) | (89,1428) | Single Tap |

FIG. 7C

| Icon Count | Type of Gesture | Frequency of clickable icon (in day) | | | | Last Activity (in minutes) | | | | Priority Score | | | |
|---|---|---|---|---|---|---|---|---|---|---|---|---|---|
| | | A1 | A2 | A3 | A4 | A1 | A2 | A3 | A4 | A1 | A2 | A3 | A4 |
| 2 | Single Tap | 3 | 13 | – | – | 73 | 19 | – | – | 0.38 | 0.62 | – | – |
| 1 | Long Tap | 2 | – | – | – | 57 | – | – | – | 1.00 | – | – | – |
| 1 | Scroll | 4 | – | – | – | 90 | – | – | – | 1.00 | – | – | – |
| 3 | Scroll | 9 | 2 | 6 | – | 2 | 13 | 18 | – | 0.27 | 0.59 | 0.14 | – |
| 4 | Single Tap | 11 | 13 | 7 | 18 | 1 | 87 | 54 | 109 | 0.53 | 0.19 | 0.07 | 0.21 |

METHOD AND ELECTRONIC DEVICE FOR PROVIDING CONTROL FUNCTIONALITY OF DISPLAY

CROSS-REFERENCE TO RELATED APPLICATION(S)

This application is a bypass continuation of International Application No. PCT/KR2023/000193, filed on Jan. 5, 2023, which is based on and claims priority to India Patent Application No. 202241000624, filed on Jan. 5, 2022, in the Intellectual Property India, the disclosures of which are incorporated by reference herein in their entireties.

BACKGROUND

1. Field

The present disclosure relates to touch functions of electronic devices, and more specifically to a method and electronic device for providing control functionality of a display to a rear end of the electronic device.

2. Description of Related Art

Electronic devices have touch sensitive displays that are responsive to user touch to perform an action. The electronic device is sensitive to the user touch on only the display side. However, there can be scenarios of non-responsiveness of the display of the electronic device during the user touch. The various scenarios of the non-responsiveness of the display of the electronic device can be caused by one or more of the following reasons such as delayed touch response, moisture content on the display (for example, during underwater photography or during rain), ghost touch, user touch with accessories that are non-conductors of electricity such as hand gloves, etc.

Also, with advancement in technology, the display of the electronic device (example tablets) comes in various sizes, some of which are very large thereby making user finger movement on the display difficult. Also, when the electronic device with a small display is used in applications such as gaming, the small display makes it difficult for the user to operate the control buttons. The electronic device usually has limited gestures available such as, for example, triple tap, etc., which limits the possibilities of operation for the electronic device in various scenarios as discussed above.

SUMMARY

One or more embodiments herein provide a method and electronic device for providing control functionality of a display to a rear end of the electronic device. The proposed method includes detecting a user context or scenario when there is non-responsiveness of the display for the electronic device and automatically enabling back tap functionality so that different types of gestures, i.e., single tap, long tap, scroll, triple tap, scroll with two fingers can be performed by the user. Therefore, the proposed method overcomes the drawbacks faced conventionally because of the non-responsiveness of a touch sensitive display of the electronic device by enabling the control functionality to the rear end of the electronic device without attaching any additional component to the electronic device.

Accordingly, embodiments herein disclose a method for providing control functionality of display of an electronic device. The method includes determining, by the electronic device, an event associated with the display of the electronic device and partitioning, by the electronic device, a rear side of the electronic device into a plurality of dynamic tiles based on a plurality of parameters associated with the display of the electronic device, in response to determining the event. Further, the method includes detecting, by the electronic device, at least one user gesture on the at least one dynamic tile on the rear side of the electronic device and classifying, by the electronic device, the at least one detected gesture into a gesture category. The method also includes determining, by the electronic device, at least one functionality to be performed on the display based on the at least one gesture on the rear side of the electronic device and the corresponding gesture category; and controlling, by the electronic device, the at least one functionality on the display of the electronic device.

In an embodiment, the event associated with the display of the electronic device comprises at least one of non-responsiveness of the display of the electronic device and reduction in user experience during interaction with the display of the electronic device.

In an embodiment, the plurality of parameters associated with the display of the electronic device comprises at least one of an aspect ratio of the electronic device, a user touch area, a sensor location and proximity of at least one actionable element with respect to other actionable elements on the display of the electronic device.

In an embodiment, the non-responsiveness of the display of the electronic device is detected based on one of a capacitance change of the display, a temperature of the electronic device, and a ghost touch on the display of the electronic device.

In an embodiment, the reduction in the user experience during interaction with the display of the electronic device is determined based on at least one of a size of the display, a number of actionable elements on the display, and a distribution pattern of the number of the actionable elements on the display.

In an embodiment, the gesture category comprises one of a single tap, a double tap, a long tap, a triple tap, a scroll with a single finger, a scroll with double fingers, and a horizontal swipe.

In an embodiment, partitioning, by the electronic device, the rear side of the electronic device into a plurality of dynamic tiles based on a plurality of parameters associated with the display of the electronic device, in response to determining the event includes dividing, by the electronic device, the rear side of the electronic device into the plurality of tiles based on the aspect ratio and dividing, by the electronic device, a front side of the electronic device into a first set of blocks based on pixel coordinates, wherein each block of the first set of blocks comprises a specific block area. The method also includes determining, by the electronic device, a touch area of a user on the display of the electronic device; determining, by the electronic device, that the touch area on the display is greater than the block area of each block of the first set of blocks; and merging, by the electronic device, at least two blocks of the first set of blocks to form a second set of blocks based on one of the touch area and the position of actionable elements on the front side of the electronic device. The method also includes determining, by the electronic device, a pattern of sensor features and coordinate values of each of the plurality of tiles on the rear side of the electronic device; mapping, by the electronic device, the coordinate values of each of the plurality of tiles on the rear side of the electronic device to corresponding second set of blocks on the front side of the electronic device; and partitioning, by the electronic device, the rear side of the electronic device into plurality of dynamic tile based on the mapping.

In an embodiment, classifying, by the electronic device, the at least one detected gesture into the gesture category includes detecting, by the electronic device, at least one touch coordinate associated with the at least one detected gesture on the rear side of the electronic device and determining, by the electronic device, a time stamp of the at least one touch coordinate associated with the at least one detected gesture. Further, the method includes inputting, by the electronic device, the at least one touch coordinate associated with the at least one detected gesture and the corresponding time stamp of the at least one touch coordinate associated with the at least one detected gesture to a third machine learning (ML) model; and classifying, by the electronic device, the at least one detected gesture into the gesture category using the third ML model.

In an embodiment, determining, by the electronic device, the at least one functionality to be performed on the display based on the at least one gesture on the rear side of the electronic device and the corresponding gesture category includes mapping, by the electronic device, coordinates associated with the at least one gesture on the rear side of the electronic device and the corresponding gesture category into the second set of blocks on the front side of the electronic device and determining, by the electronic device, the at least one functionality to be performed on the display based on the mapping. The mapping comprises a start coordinate and an end coordinate of at least one tile of the plurality of tiles, a tile number, and a list of applications within the area of the at least one tile.

In an embodiment, the method further includes determining, by the electronic device, the plurality of functionalities to be performed on the display based on the at least one gesture on the rear side of the electronic device. Further, the method includes inputting, by the electronic device, a plurality of actionable elements within the tile area, a frequency of usage of the actionable elements, a last activity on the electronic device, and the gesture category of the at least one gesture to a fourth ML model; and determining, by the electronic device, a priority score for each of the plurality of functionalities to be performed on the display using the fourth ML model.

In an embodiment, the method further includes storing, by the electronic device, the at least one gesture, the corresponding gesture category and the priority score for each of the plurality of functionality to be performed on the display. The method also includes determining, by the electronic device, the at least one gesture on the rear side of the electronic device for performing the plurality of functionalities; and automatically determining, by the electronic device, the at least one functionality to be performed based on the stored priority score for each of the plurality of functionalities.

In an embodiment, detecting, by the electronic device, the at least one user gesture on the at least one dynamic tile on the rear side of the electronic device includes inputting, by the electronic device, predefined features and derived features associated with the at least one user gesture to a first ML model and determining, by the electronic device, a quadrant of a set of four quadrants of the at least one user gesture by the first ML model. Further, the method includes inputting, by the electronic device, the determined quadrant of the at least one user gesture into a second ML model, wherein the second ML model is TensorFlow's Keras sequential model; determining, by the electronic device, coordinates of the at least one user gesture by the second ML model; and detecting, by the electronic device, the at least one user gesture on the at least one dynamic tile on the rear side of the electronic device based on coordinates of the at least one user gesture.

Accordingly, embodiments herein disclose an electronic device for providing control functionality of a display. The electronic device includes a memory, a processor, a communicator and a touch management controller. The touch management controller is configured to determine an event associated with the display of the electronic device and partition a rear side of the electronic device into plurality of dynamic tiles based on a plurality of parameters associated with the display of the electronic device, in response to determining the event. The touch management controller is also configured to detect at least one user gesture on the at least one dynamic tile on the rear side of the electronic device and classify the at least one detected gesture into a gesture category. Further, the touch management controller is configured to determine at least one functionality to be performed on the display based on the at least one gesture on the rear side of the electronic device and the corresponding gesture category; and control the at least one functionality on the display of the electronic device.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

Embodiments of the invention are illustrated in the accompanying drawings, throughout which like reference letters indicate corresponding parts in the various figures. The embodiments herein will be better understood from the following description with reference to the drawings, in which:

FIG. 2A is a flow diagram illustrating a method for providing control functionality of the display of the electronic device, according to an embodiment as disclosed herein;

FIG. 3A illustrates a sample data set used for fault detection by an activation management controller, according to an embodiment as disclosed herein;

FIG. 3B illustrates various operations involved in determining an activation state of the rear side control functionality of the electronic device, according to an embodiment as disclosed herein;

FIG. 4B illustrates various operations performed by the tiling management controller for partitioning the rear side of the electronic device into multiple dynamic tiles, according to an embodiment as disclosed herein;

FIG. 5B illustrates examples of sample data for a touch coordinate detection controller, according to an embodiment as disclosed herein.

FIG. 6A illustrates a sample data set for the gesture classification controller for classifying the gesture performed on the rear side of the electronic device, according to an embodiment as disclosed herein;

FIG. 7C illustrates sample data for determining a priority score for each of plurality of functionality to be performed on the display using the fourth ML model, according to an embodiment as disclosed herein;

DETAILED DESCRIPTION

Figure 1A:
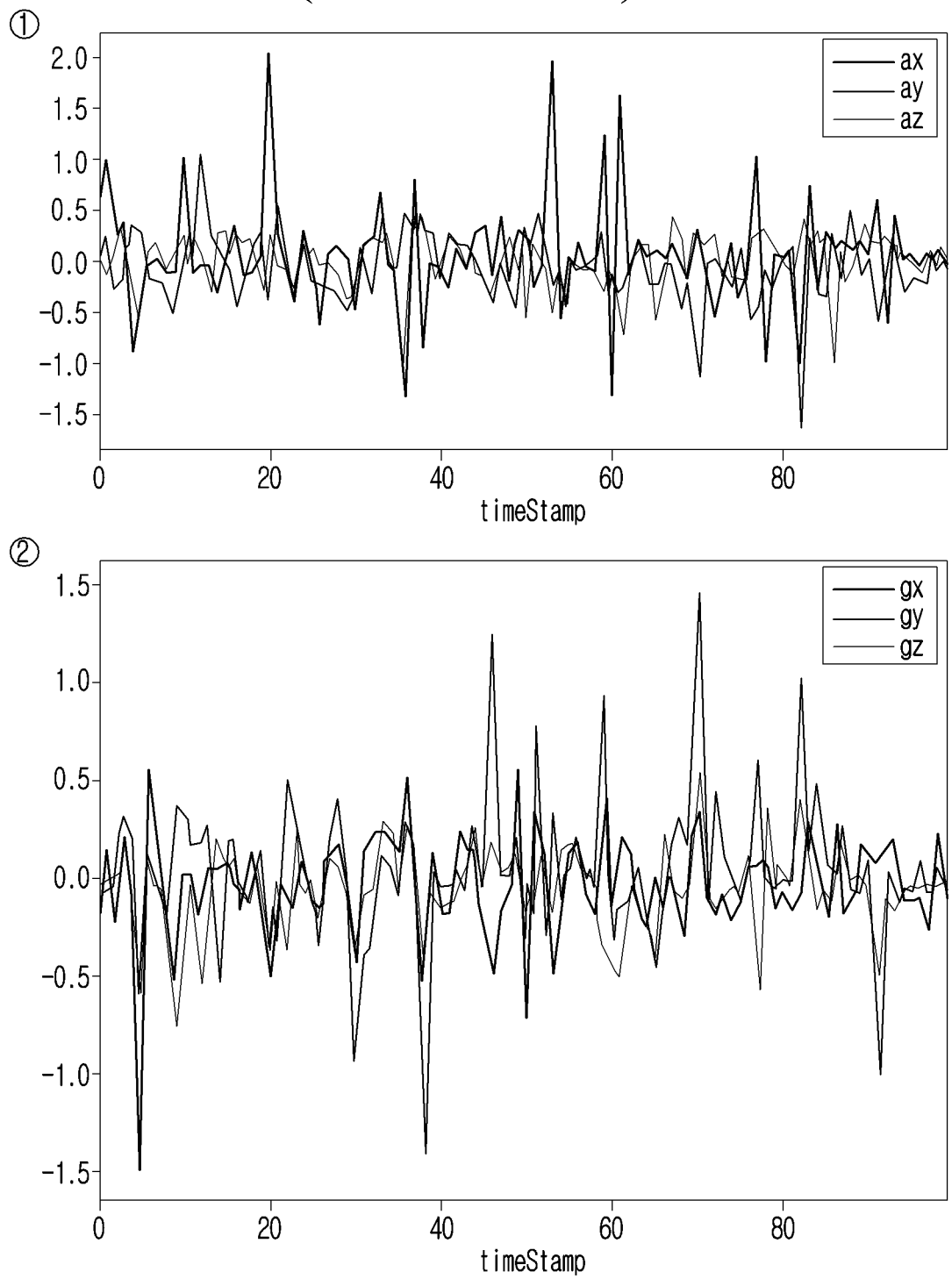
FIG. 1A illustrates graphs for accelerometer and gyroscope with respect to time when swiped from a rear end of an electronic device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for providing control functionality of a display of an electronic device. The method includes determining, by the electronic device, an event associated with the display of the electronic device and partitioning, by the electronic device, a rear side of the electronic device into plurality of dynamic tile based on a plurality of parameters associated with the display of the electronic device, in response to determining the event. Further, the method includes detecting, by the electronic device, at least one user gesture on the at least one dynamic tile on the rear side of the electronic device and classifying, by the electronic device, the at least one detected gesture into a gesture category. The method also includes determining, by the electronic device, at least one functionality to be performed on the display based on the at least one gesture on the rear side of the electronic device and the corresponding gesture category. Also, the method includes controlling, by the electronic device, the at least one functionality on the display of the electronic device.

Accordingly, embodiments herein disclose an electronic device for providing control functionality of display. The electronic device includes a memory, a processor, a communicator, and a touch management controller. The touch management controller is configured to determine an event associated with the display of the electronic device and partition a rear side of the electronic device into plurality of dynamic tile based on a plurality of parameters associated with the display of the electronic device, in response to determining the event. The touch management controller is also configured to detect at least one user gesture on the at least one dynamic tile on the rear side of the electronic device and classify the at least one detected gesture into a gesture category. Further, the touch management controller is configured to determine at least one functionality to be performed on the display based on the at least one gesture on the rear side of the electronic device and the corresponding gesture category, and control the at least one functionality on the display of the electronic device.

Conventional methods and systems provide software based solutions that can perform tap gesture using front and back camera of a smartphone. However, the conventional methods and systems provide limited gesture availability, the camera consumes a large amount of power resources, a small area is used to perform the gesture, or the user is required to wear gloves made with special material that can conduct electricity, all of which makes the process of providing additional functionality cumbersome and difficult.

Conventional methods and systems require special hardware and may not be suitable for use during summer. Also, some other conventional method provides additional control buttons to the electronic device by mapping game buttons with the additional control buttons. This reduces the ease of usage of the electronic device and makes the electronic device bulky. Unlike conventional methods and systems, one or more embodiments replace hardware button functionality with back gesture functionality, and also embodiments enable the rear end functionality using exiting (rear) sensors on the electronic device.

Conventional methods and systems have variable user interface (UI) element distribution on the display of the electronic device. The display of the electronic device has lots of activities, windows, and fragments having variable UI element distributions. The user faces difficulty when the phone display window has a dense distribution or sparse distribution.

When the display becomes non-responsive, operation of the electronic device is hindered and the desired action cannot be executed, such as, e.g., during an incoming call or when a call pickup button is not working. According to one or more embodiments, when the non-responsiveness of the display is detected, the rear end control functionality is enabled for the electronic device. As a result, the user does not have to hindered by the non-operation of the display of the electronic device, and the proposed method improves the user experience.

Unlike conventional methods and systems, the proposed method of embodiments addresses the limited availability of gestures because of a display size constraint, the limitations in power resources, and the large number of actionable buttons for an activity.

The non-responsiveness of the electronic device may be caused due to at least one of the following: a constant mutual data leading to zero capacitance change, which makes it difficult to recognize touch; an abnormal change in device temperature leading to disabling of CPU cores which hampers responsiveness of the electronic device; and/or insufficient memory leading to hang-up of the electronic device or delayed touch response thereby resulting in a bad user experience.

Referring now to the drawings, and more particularly to FIGS. 1A through 12, where similar reference characters denote corresponding features consistently throughout the figures, there are shown preferred embodiments.

FIG. 1A illustrates example graphs for an accelerometer and a gyroscope with respect to time when swiped from a rear end of an electronic device.

Generally, accelerometers in the electronic device are used to detect orientation of the electronic device. The accelerometers measure linear acceleration of movement of the electronic device. Gyroscope in the electronic device is used to obtain additional dimensions to the information received from the accelerometers by tracking rotation or twist. The gyroscope measures the angular rotational velocity. Referring to the FIG. 1A, at circle 1, a accelerometer graph is provided that illustrates the reading of the accelerometer against a timestamp when the user swipes on the rear end of the electronic device. Multiple peeks are observed in accelerometer graph when the user swipes on the rear end of the electronic device especially in the X axis. However, from the graph it may be difficult to distinguish when the swipe/tap has occurred. But, a closer look reveals that a spike in the respective axes can be used to distinguish and identify the time. Therefore, the peaks can be classified as a valid touch and can be improved further with on-device artificial intelligence (AI) models.

Further, at circle 2, a gyroscope graph is provided that illustrates the reading of the gyroscope against a timestamp when the user swipes on the rear end of the electronic device. Here too, multiple peeks are observed in the gyroscope graph when the user swipes on the rear end of the electronic device especially in Y axis and Z axis. Therefore, the peaks can be classified as a valid touch and can be improved further with on-Device AI model.

Figure 1B:
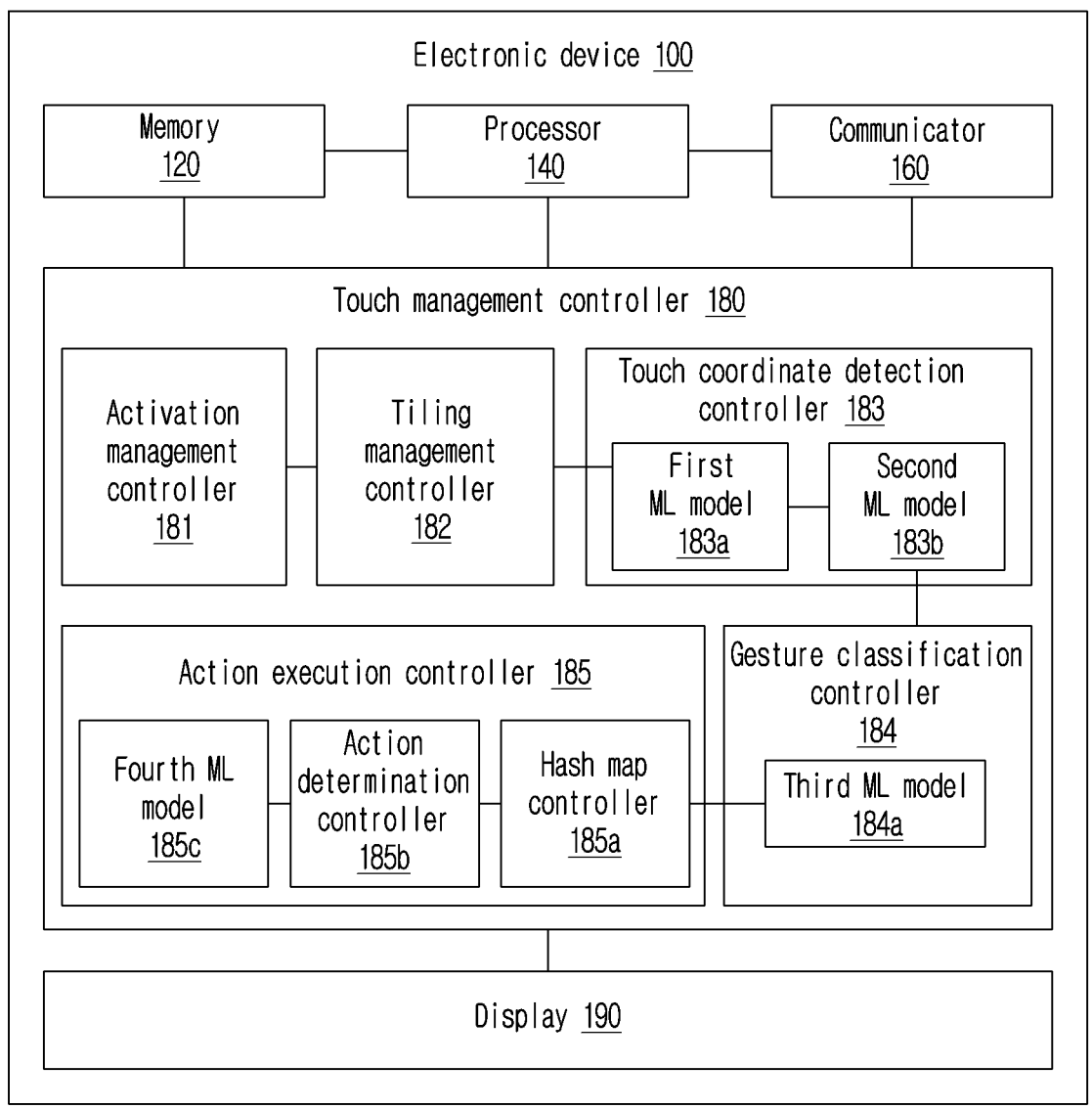
FIG. 1B illustrates a block diagram of an electronic device for providing control functionality of a display of the electronic device, according to an embodiment as disclosed herein.

FIG. 1B illustrates a block diagram of an electronic device (100) for providing control functionality of a display (190) of the electronic device (100), according to an embodiment as disclosed herein. The electronic device (100) can be, but not limited to a laptop, a palmtop, a desktop, a mobile phone, a smart phone, Personal Digital Assistant (PDA), a tablet, a wearable device, an Internet of Things (IoT) device, a virtual reality device, a foldable device, a flexible device, an immersive system, etc. In an embodiment, the electronic device (100) includes a memory (120), a processor (140), a communicator (160), a touch management controller (180), and a display (190).

The memory (120) is configured to store multiple gesture category information. The memory (120) is configured to store a gesture, corresponding gesture category, and priority score for each of a plurality of functionalities to be performed on the display (190). The memory (120) is also configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the touch management controller (180). The processor (140) is configured to execute instructions stored in the memory (120) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the electronic device (100) and with external devices via one or more networks.

In an embodiment, the touch management controller (180) includes an activation management controller (181), a tiling management controller (182), a touch coordinate detection controller (183), a gesture classification controller (184), and an action execution controller (185). The touch management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment, the activation management controller (181) is configured to determine an event associated with the display (190) of the electronic device (100). The event associated with the display (190) of the electronic device (100) can be, for example, but not limited to non-responsiveness of the display (190) of the electronic device (100) and a reduction in user experience during interaction with the display (190) of the electronic device (100). The reduction in user experience during interaction with the display (190) of the electronic device (100) can be caused due to too many actionable elements on the display (190), multiple control options to be accessed by the user while using a gaming application, etc.

In an embodiment, the tiling management controller (182) is configured to partition a rear side of the electronic device (100) into multiple dynamic tiles based on a plurality of parameters associated with the display (190) of the electronic device (100), in response to determining the event. The plurality of parameters associated with the display (190) of the electronic device (100) includes but is not limited to an aspect ratio of the electronic device (100), a user touch area, a sensor location, and a proximity of actionable elements with respect to other actionable elements on the display (190) of the electronic device (100). The non-responsiveness of the display (190) of the electronic device (100) is detected based on one of a capacitance change of the display (190), a temperature of the electronic device (100), and a ghost touch on the display (190) of the electronic device (100). The reduction in the user experience during interaction with the display (190) of the electronic device (100) is determined based on at least one of a size of the display (190), a number of actionable elements on the display (190), and a distribution pattern of the number of the actionable elements on the display (190).

The tiling management controller (182) is configured to partition the rear side of the electronic device (100) by dividing the rear side of the electronic device (100) into the plurality of tiles based on the aspect ratio and dividing a front side of the electronic device (100) into a first set of blocks based on pixel coordinates. Further, the tiling management controller (182) is configured to determine a touch area of a user on the display (190) of the electronic device (100) and determine that the touch area on the display (190) is greater than the block area of each block of the first set of blocks. The tiling management controller (182) is also configured to merge at least two blocks of the first set of blocks to form a second set of blocks based on one of the touch area and the position of actionable elements on the front side of the electronic device (100), determine a pattern of sensor features and coordinate values of each of the plurality of tiles on the rear side of the electronic device (100), map the coordinate values of each of the plurality of tiles on the rear side of the electronic device (100) to corresponding second set of blocks on the front side of the electronic device (100), and partition the rear side of the electronic device (100) into plurality of dynamic tiles based on the mapping. Each block of the first set of blocks comprises a specific block area.

In an embodiment, the touch coordinate detection controller (183) is configured to detect a user gesture on the at least one dynamic tile on the rear side of the electronic device (100) based on quadrants and coordinates of the user gesture on the at least one dynamic tile on the rear side of the electronic device (100). The touch coordinate detection controller (183) is configured to input predefined features and derived features associated with the at least one user gesture to a first machine learning (ML) model (183*a*) and determine a quadrant of a set of four quadrants of the at least one user gesture by the first ML model (183*a*). Further, the touch coordinate detection controller (183) is configured to input the determined quadrant of the at least one user gesture into a second ML model (183*b*), determine coordinates of the at least one user gesture by the second ML model (183*b*), and detect the at least one user gesture on the at least one dynamic tile on the rear side of the electronic device (100)

based on coordinates of the at least one user gesture. The second ML model (183b) is Tensorflow's Keras sequential model.

In an embodiment, the gesture classification controller (184) is configured to receive the touch coordinate associated with the at least one detected gesture on the rear side of the electronic device (100) and a time stamp of the at least one touch coordinate associated with the at least one detected gesture. Further, the gesture classification controller (184) is configured to input the at least one touch coordinate associated with the at least one detected gesture and the corresponding time stamp of the at least one touch coordinate associated with the at least one detected gesture to a third ML model (184a) and classify the at least one detected gesture into the gesture category using the third ML model (184a). The gesture category is one of a single tap, a double tap, a long tap, a triple tap, a scroll with a single finger, a scroll with double fingers, and a horizontal swipe.

In an embodiment, the action execution controller (185) is configured to map coordinates associated with the at least one gesture on the rear side of the electronic device (100) and the corresponding gesture category into the second set of blocks on the front side of the electronic device (100) and determine the at least one functionality to be performed on the display (190) based on the mapping. The mapping comprises a start coordinate and an end coordinate of at least one tile of the plurality of tiles, a tile number, and a list of applications within the tile area of the at least one tile.

Further, the action execution controller (185) is configured to determine the plurality of functionalities to be performed on the display (190) based on the gesture on the rear side of the electronic device (100). The action execution controller (185) is configured to input a plurality of actionable elements within the tile area, a frequency of usage of the actionable elements, a last activity on the electronic device (100), and the gesture category of the at least one gesture into a fourth ML model (185c). Also, the action execution controller (185) is configured to determine a priority score for each of the plurality of functionalities to be performed on the display (190) using the fourth ML model (185c).

Further, the action execution controller (185) is configured to store the at least one gesture, the corresponding gesture category, and the priority score for each of the plurality of functionalities to be performed on the display (190). The action execution controller (185) is configured to determine the at least one gesture on the rear side of the electronic device (100) for performing the plurality of functionalities, and automatically determine the at least one functionality of the plurality of functionalities to be performed based on the stored priority score for each of the plurality of functionality.

At least one of the plurality of modules/components of the touch management controller (180) may be implemented by an artificial intelligence (AI) model. A function associated with the AI model may be performed by the memory (120) and the processor (140). The one processor or a plurality of processors controls the processing of the input data in accordance with a predefined operating rule or the AI model stored in the non-volatile memory and the volatile memory. The predefined operating rule or AI model (having an algorithm) is provided by training or learning.

Here, being provided by learning means that, by applying a learning process to a plurality of learning data, a predefined operating rule or AI model of a desired characteristic is made. The learning may be performed in a device itself in which AI model according to an embodiment is performed, and/or may be implemented by a separate server/system.

The AI model may include of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training algorithm(s) of the AI model that can be utilized in a predetermined target device (for example, a robot) using a plurality of learning data to cause, allow, or control the AI model (resulting in control of the target device) to make a determination or prediction. Examples of learning processes include, but are not limited to, supervised learning, unsupervised learning, semi-supervised learning, or reinforcement learning.

In an embodiment, the display (190) is configured to display multiple actionable elements on a screen of the electronic device (100) in a grid format. The display (190) is capable of receiving inputs and is made of one of a liquid crystal display (LCD), light emitting diodes (LEDs), organic light-emitting diodes (OLEDs), etc. The display (190) is configured to perform actions based on inputs received on the rear end of the electronic device (100). The rear end of the electronic device (100) includes one or more sensors (e.g., cameras) for capturing gestures on the rear side of the electronic device (100).

Although the FIG. 1B shows various hardware components of the electronic device (100), it is to be understood that other embodiments are not limited thereon. In other embodiments, the electronic device (100) may include less or more components. Further, the labels or names of the components are used only for illustrative purpose and do not limit the scope of the invention. One or more components can be combined together to perform the same or substantially similar function to provide the control functionality of the display (190).

FIG. 2A is a flow diagram (200a) illustrating a method for controlling functionality of the display (190) of the electronic device (100), according to an embodiment as disclosed herein.

Referring to the FIG. 2A, at step 202a, the method includes the electronic device (100) determining the event associated with the display (190) of the electronic device (100). For example, in the electronic device (100) described in the FIG. 1B, the touch management controller (180) is configured to determine the event associated with the display (190) of the electronic device (100).

At step 204a the method includes the electronic device (100) partitioning the rear side of the electronic device (100) into plurality of dynamic tile based on the plurality of parameters associated with the display (190) of the electronic device (100), in response to determining the event. For example, in the electronic device (100) described in the FIG. 1B, the touch management controller (180) is configured to partition the rear side of the electronic device (100) into plurality of dynamic tiles based on the plurality of parameters associated with the display of the electronic device (100), in response to determining the event.

At step 206a, the method includes the electronic device (100) detecting the at least one user gesture on at least one dynamic tile of the plurality of dynamic tiles on the rear side of the electronic device (100). For example, in the electronic device (100) described in the FIG. 1B, the touch management controller (180) is configured to detect the at least one user gesture on the at least one dynamic tile on the rear side of the electronic device (100) using, for example, a rear sensor.

At step 208a, the method includes the electronic device (100) classifying the at least one detected gesture into the gesture category. For example, in the electronic device (100) described in the FIG. 1B, the touch management controller (180) is configured to classify the at least one detected gesture into the gesture category.

At step 210a, the method includes the electronic device (100) determining the at least one functionality to be performed on the display (190) based on the at least one gesture on the rear side of the electronic device (100) and the corresponding gesture category. For example, in the electronic device (100) described in the FIG. 1B, the touch management controller (180) is configured to determine the at least one functionality to be performed on the display (190) based on the at least one gesture on the rear side of the electronic device (100) and the corresponding gesture category.

At step 212a, the method includes the electronic device (100) controlling the at least one functionality on the display (190) of the electronic device (100). For example, in the electronic device (100) described in the FIG. 1B, the touch management controller (180) is configured to control the at least one functionality on the display (190) of the electronic device (100).

The various actions, acts, blocks, steps, or the like in the flow diagram (200a) may be performed in the order presented, in a different order, or simultaneously. Further, in some embodiments, some of the actions, acts, blocks, steps, or the like may be omitted, added, modified, skipped, or the like without departing from the scope of the invention.

Figure 2B:
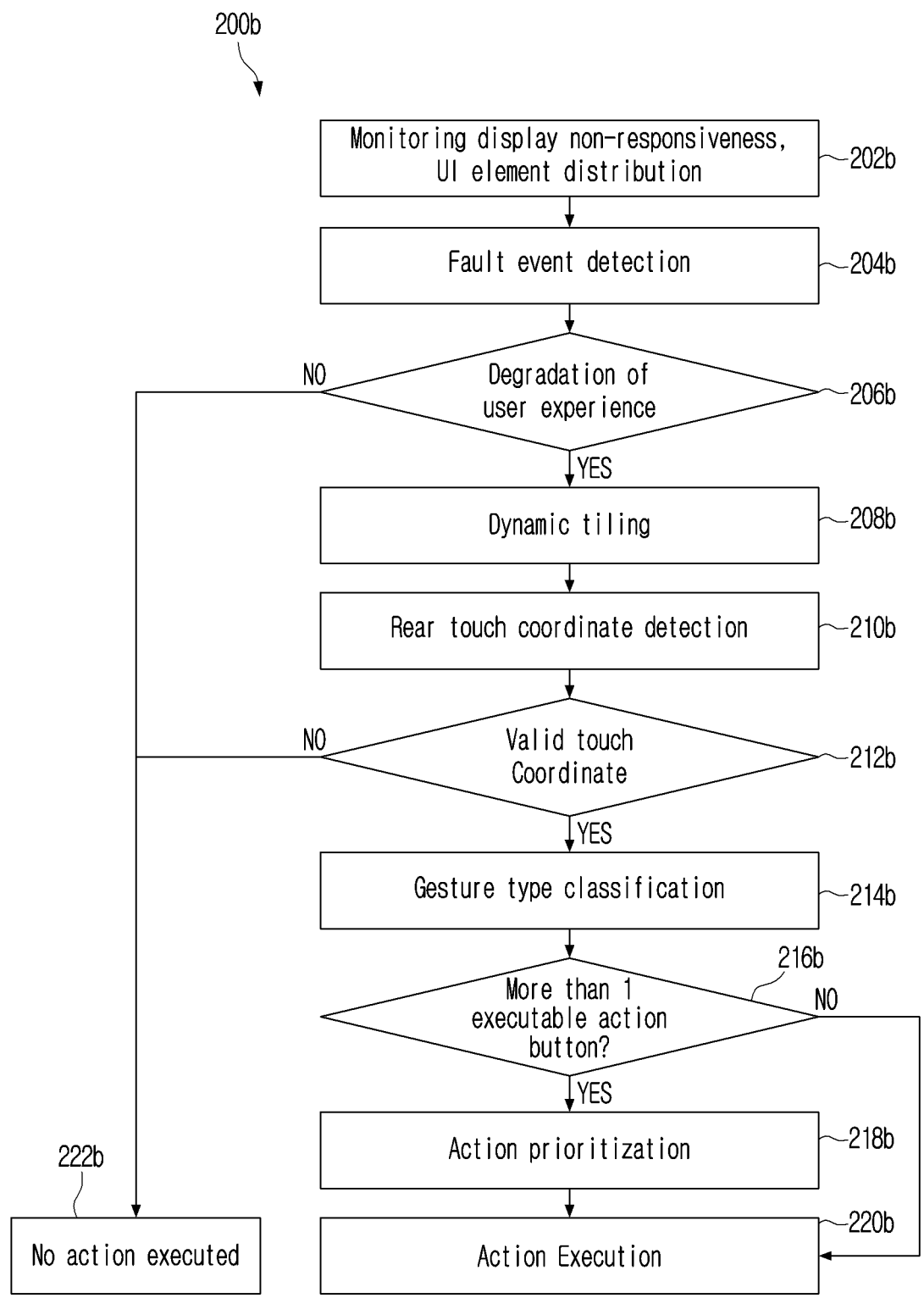
FIG. 2B is a flow chart illustrating a procedure for executing the action on the electronic device, according to an embodiment as disclosed herein.

FIG. 2B is a flow chart (200b) illustrating a procedure for executing the action on the electronic device (100), according to an embodiment as disclosed herein. At step 202b, the method includes the electronic device (100) continuously monitoring one of the non-responsiveness of the display (190) and the UI element distribution. At step 204b, the method includes the electronic device (100) determining the faulty event leading to the non-responsiveness. At step 206b, the method includes the electronic device (100) determining whether the user experience is degraded due to the detected faulty event in the electronic device (100). On determining that the user experience is degraded due to the detected faulty event in the electronic device (100), at step 208b, the method includes the electronic device (100) performing dynamic tiling of the rear side of the electronic device (100) based on a plurality of parameters associated with the display (190) of the electronic device (100).

At step 210b, the method includes the electronic device (100) receiving and determining the rear touch coordinates. Further, at step 212b, the electronic device (100) determines if the touch/gesture received on the rear side comprises valid touch coordinates. On determining that the touch/gesture received on the rear side comprises the valid touch (i.e., valid touch coordinates), at step 214b, the electronic device (100) classifies the gesture into a gesture type. Further, at step 216b, the electronic device (100) determines if there are more than one executable action buttons. On determining that there are more than one executable action buttons, at step 218b, the electronic device (100) performs the action prioritization and at step 220b, the electronic device (100) executes the action with the highest priority. If there is not more than one executable action button, then the electronic device (100) executes the action determined.

On determining that the user experience is not degraded (at step 206b), this is recognized as meaning that the touch/gesture received on the rear side does not have valid touch coordinates (at step 212b), and then at step 222b, the electronic device (100) does not execute any action.

FIG. 3A illustrates a sample data set used for fault detection by the activation management controller (181), according to an embodiment as disclosed herein. The activation management controller (181) detects events that can cause non-responsiveness of the display (190) of the electronic device (100) or degradation of the user experience due to the size of the display (190). The activation management controller (181) receives various inputs such as mutual data, touch count, device temperature of the electronic device (100), the size of the display (190), and a number of actionable icons on the display (190). Using the inputs, the activation management controller (181) detects the events that can cause non-responsiveness of the display (190) of the electronic device (100) or degradation of the user experience due to the size of the display (190). Based on whether the events causing the non-responsiveness of the display (190) of the electronic device (100) or the degradation of the user experience due to the size of the display (190) are determined, the activation management controller (181) activates or deactivates the rear end gesture functionality.

Referring to the FIG. 3A, multiple inputs are received and the activation state is determined as 1 or 0 for each input. The activation state "1" means that the rear side control functionality of the electronic device (100) is enabled and the activation state "0" means that the rear side control functionality of the electronic device (100) is disabled.

FIG. 3B illustrates various steps involved in determining the activation state of the rear side control functionality of the electronic device (100), according to an embodiment as disclosed herein. Referring to the FIG. 3B, at step 301, a capacitive touchscreen includes a charged matrix, or field, of columns and rows that are read or scanned by the processor (140). When a finger or stylus interacts with the screen, the processor (140) can "read" the touch point because of "mutual capacitance." The mutual capacitance is called mutual data. When the mutual data is constant (e.g., approximately (~) a maximum value 255), then the display (190) is not able to recognize the touch. Therefore, once the mutual data is constant, the rear side control functionality of the electronic device (100) is activated. At block 1, an example indicating constant mutual data in an underwater scenario is provided.

At block 2, the battery temperature represents a device heat up state (e.g., temperature). Because of an abnormal battery temperature, a different number of CPU cores is disabled, which leads to delayed touch response. On detecting the delayed touch response, the rear side control functionality of the electronic device (100) is activated by the activation management controller (181). At block 2 in the FIG. 3B, battery temperature API of the electronic device (100) is provided.

At block 3, the touch count represents a number of times the user is clicking on the display (190). Due to the faulty event of the non-responsiveness of the display (190), there is consistent increase in the touch count which is used by the activation management controller (181) to determine whether the rear side control functionality of the electronic device (100) needs to be activated. Here a touch count threshold can be set for the touch count and when the touch count crosses the touch count threshold, the activation management controller (181) can activate the rear side control functionality of the electronic device (100).

At block 4, the ghost touch or false touch refers to the scenario when the display (190) gives non-desired output. A Manhattan distance between input coordinate and output coordinate is used by the activation management controller (181) to identify the ghost/false touch. On determining the ghost/false touch, the activation management controller (181) activates the rear side control functionality of the electronic device (100). At block 4 in the FIG. 3B an example of determining the Manhattan distance (obtained in step 303) between the input coordinates (obtained in step 301) and the output coordinates (obtained in step 302) to identify the ghost/false touch is provided.

At block 5, the UI element distribution represents placements of the actionable elements with respect to each other on the display (190) of the electronic device (100). Due to the different display size such as dense distribution for smaller display and sparse distribution for larger display is not desirable for the end user. Based the distribution of the actionable elements, the activation management controller (181) activates the rear side control functionality of the electronic device (100).

Figure 3C:
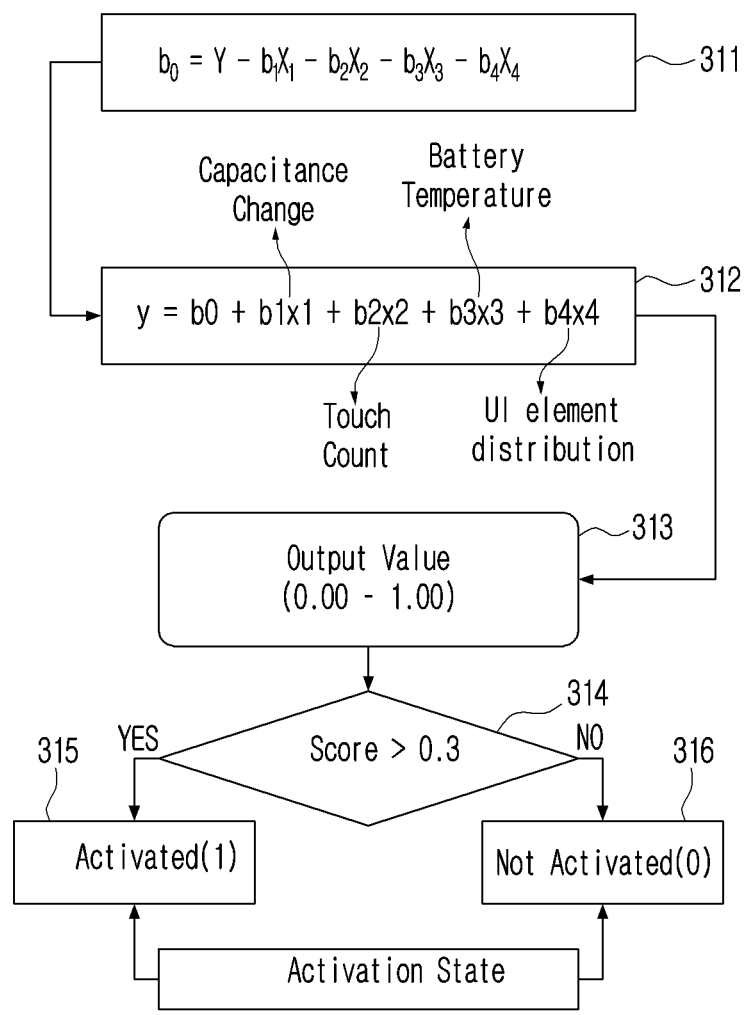
FIG. 3C illustrates operations of the activation management controller, according to an embodiment as disclosed herein.

FIG. 3C will be described based on the following equation.

$$b_1 = \frac{(\Sigma X_1^2)(\Sigma X_1 Y) - (\Sigma X_1 X_2)(\Sigma X_2 Y) - (\Sigma X_1 X_3)(\Sigma X_3 Y) - (\Sigma X_1 X_4)(\Sigma X_4 Y)}{(\Sigma X_1^2)(\Sigma X_2^2)(\Sigma X_3^2)(\Sigma X_4^2) - (\Sigma X_1 X_2 X_3 X_4)}$$

$$b_2 = \frac{(\Sigma X_2^2)(\Sigma X_2 Y) - (\Sigma X_2 X_1)(\Sigma X_3 Y) - (\Sigma X_2 X_4)(\Sigma X_3 Y) - (\Sigma X_2 X_4)(\Sigma X_4 Y)}{(\Sigma X_1^2)(\Sigma X_2^2)(\Sigma X_3^2)(\Sigma X_4^2) - (\Sigma X_1 X_2 X_3 X_4)}$$

$$b_3 = \frac{(\Sigma X_3^2)(\Sigma X_3 Y) - (\Sigma X_3 X_1)(\Sigma X_1 Y) - (\Sigma X_3 X_2)(\Sigma X_2 Y) - (\Sigma X_3 X_4)(\Sigma X_4 Y)}{(\Sigma X_1^2)(\Sigma X_2^2)(\Sigma X_3^2)(\Sigma X_4^2) - (\Sigma X_1 X_2 X_3 X_4)}$$

$$b_4 = \frac{(\Sigma X_4^2)(\Sigma X_4 Y) - (\Sigma X_4 X_1)(\Sigma X_1 Y) - (\Sigma X_4 X_2)(\Sigma X_2 Y) - (\Sigma X_4 X_3)(\Sigma X_3 Y)}{(\Sigma X_1^2)(\Sigma X_2^2)(\Sigma X_3^2)(\Sigma X_4^2) - (\Sigma X_1 X_2 X_3 X_4)}$$

$$RMSE = \sqrt{\sum_{i=1}^{n} \frac{(\hat{y}_i - y_i)^2}{n}}$$

FIG. 3C illustrates an example of the internal working of the activation management controller (181), according to an embodiment as disclosed herein. Referring to the FIG. 3C, at step 311, the activation management controller (181) receives the capacitance change of the electronic device (100), the touch count, the battery temperature, and the UI element distribution in the activity. These values are fed to multiple regression models in the activation management controller (181) to determine the activation state, at step 312.

The root mean square error (RMSE) is minimized to attain more accuracy. At step 313, the output value is between 0.00-1.00. At step 314, it is checked whether the output value is greater than 0.3, and if the output value is greater than 3, then at step 315 the activation management controller (181) activates the rear side control functionality of the electronic device (100). If the output value is not greater than 0.3, then at step 316 the activation management controller (181) does not activate the rear side control functionality of the electronic device (100).

Figure 3D:
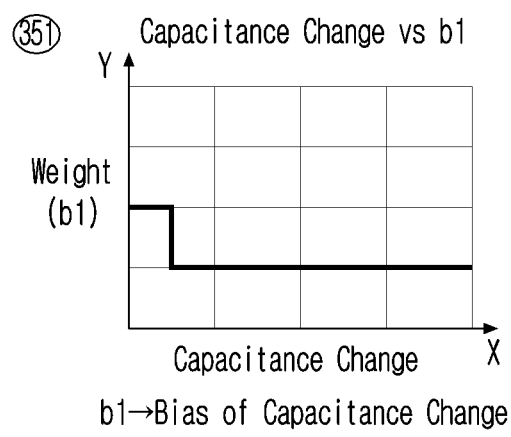
FIG. 3D illustrates graphs of various inputs with respect to biases provided to the activation management controller, according to an embodiment as disclosed herein.
Figure 3D:
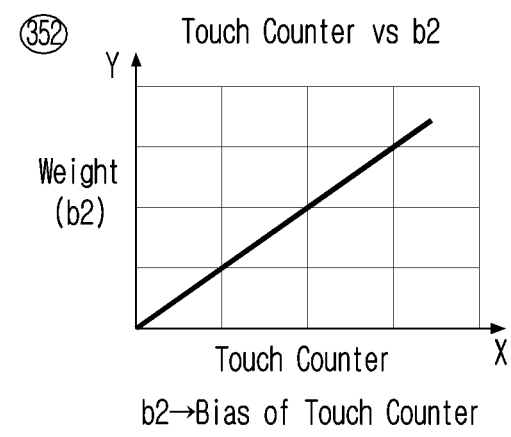
Figure 3D:
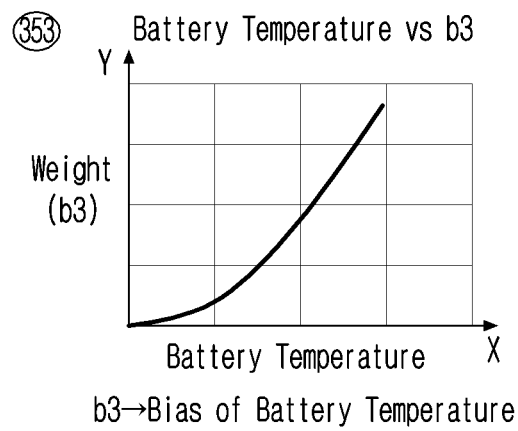
Figure 3D:
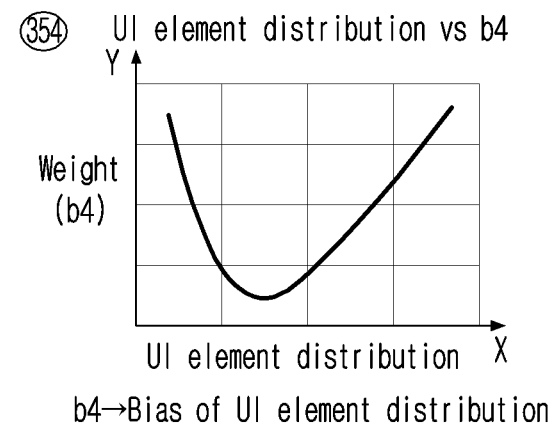

FIG. 3D illustrates graphs of various inputs with respect to bias provided to the activation management controller (181), according to an embodiment as disclosed herein.

Referring to the FIG. 3D, at block 351, the graph includes bias of capacitance (b1) on Y axis versus capacitance change on X axis. At block 352, the graph includes bias of touch counter (b2) on Y axis versus touch counter on X axis. At block 353, the graph includes bias of battery temperature (b3) on Y axis versus battery temperature on X axis. At block 354, the graph includes bias of UI element distribution (b4) on Y axis against UI element distribution on X axis.

Figure 4A:
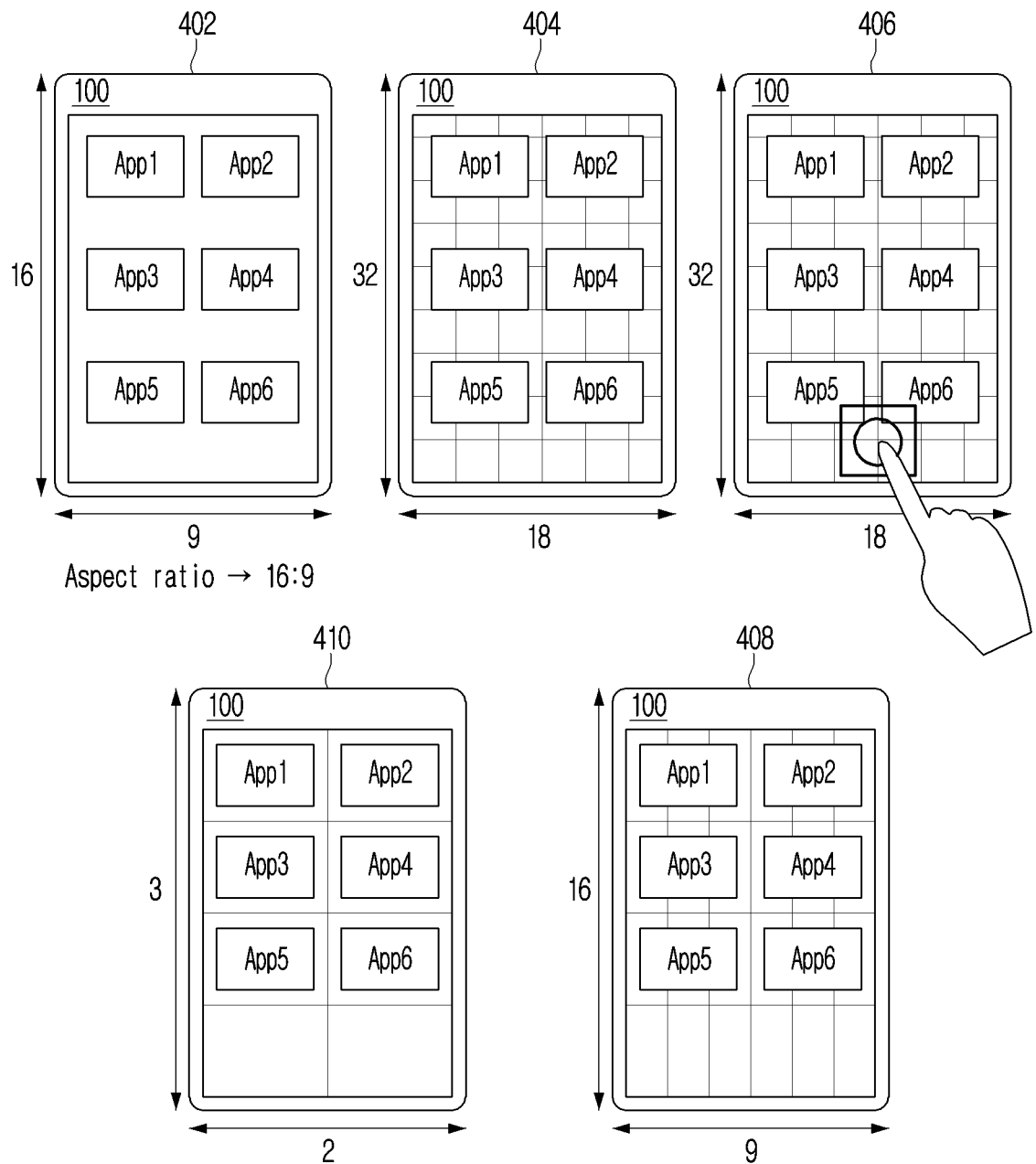
FIG. 4A illustrates examples of a tiling management controller partitioning the rear side of the electronic device into multiple dynamic tiles, according to an embodiment as disclosed herein.

FIG. 4A illustrates an example of the tiling management controller (182) partitioning the rear side of the electronic device (100) into multiple dynamic tiles, according to an embodiment as disclosed herein. Referring to the FIG. 4A, at step 402, the tiling management controller (182) in response to the activation of the rear side control functionality of the electronic device (100), determines the aspect ratio of the display (190) of the electronic device (100). In the example provided, the aspect ratio of the display (190) is 16:9, but other aspect ratios may be used. The electronic device (100) partitions the screen of the display (190) into 32×18, which means a single tile has the area of 0.25 square (sq.) units.

At step 404, the electronic device (100) initially partitions the entire screen of the electronic device (100) based on the aspect ratio as 32×18. Further, at step 406, the electronic device (100) determines that the finger area of the user while providing the input based on the touch being 1 sq. unit. Therefore, four tiles are now merged into a single tile based on the finger area of the user. At step 408, the electronic device (100) automatically divides the screen based on touch size, so the screen is divided into 16:9. At step 410, the electronic device (100) considers the number of UI components and the location of the UI components using a layout boundary property. Based on the location of the UI components, the tiles are further merged, and the activity is partitioned into 3:2.

Figure 4B:
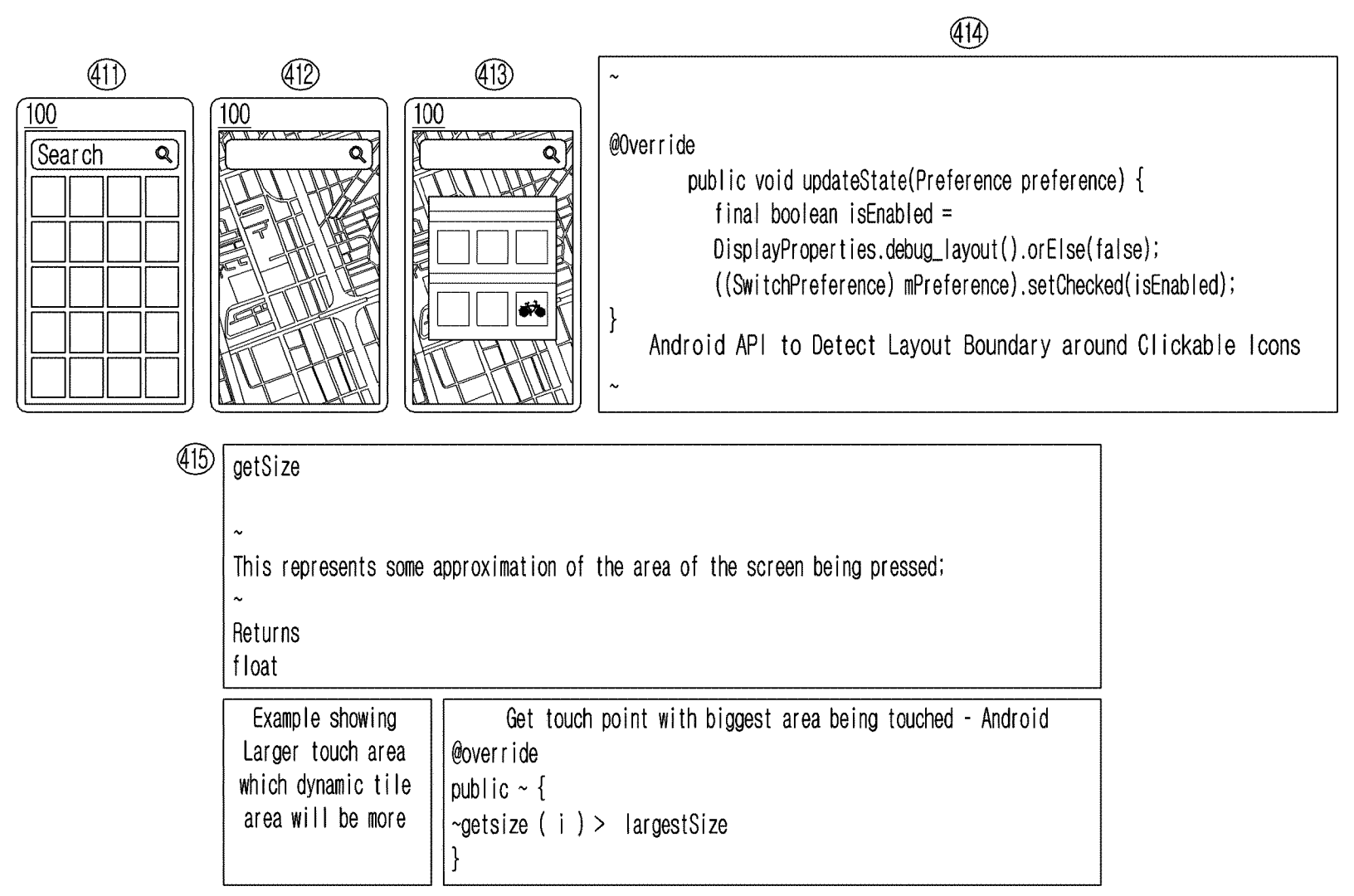

FIG. 4B illustrates various steps performed by the tiling management controller (182) for partitioning the rear side of the electronic device (100) into multiple dynamic tiles, according to an embodiment as disclosed herein. Referring to the FIG. 4B, the tiling management controller (182) divides the rear end of the electronic device (100) into tiles as per the aspect ratio. The number of tiles initially is the maximum possible. For example, if the aspect ratio of mobile screen is 16:9, then the maximum number of tiles will be 32:18. Then, the tiling management controller (182) divides the main screen into sets of pixel coordinates according to the number of tiles. The tiling management controller (182) then determines the pattern of sensor features and their coordinate values in these tiles and maps the imaginary coordinates to the respective set of pixels. The tiling management controller (182) also merges the tiles according to the user touch size, the UI components, and the corresponding location of the UI components. The tiling management controller (182) maintains a hashmap with key as tile coordinates (start and end coordinates) and value as (tile number and list of applications).

Steps 411, 412, 413, and 414 in the FIG. 4B shows the layout boundaries of different UIs. The dynamic tiles are generated with different sizes by the tiling management controller (182) based on the layout boundary. Step 414 indicates that the API detects the layout boundary around clickable icons. At step 415, the tiling management controller (182) uses the getSize( ) API of Motion Event to calculate touch size of user. As can be seen, FIG. 4B shows an example of a larger touch area for a dynamic tile area.

Figure 4C:
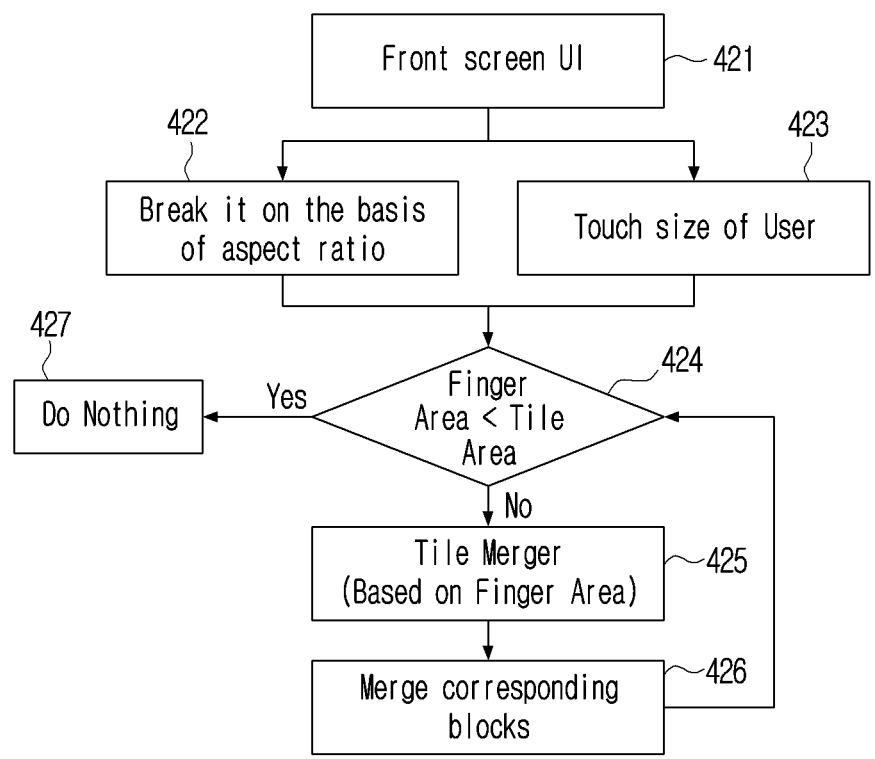
FIG. 4C is a flow chart illustrating a method for merging the tiles by the tiling management controller, according to an embodiment as disclosed herein.

FIG. 4C is a flow chart illustrating a method for merging the tiles by the tiling management controller (182), according to an embodiment as disclosed herein. Referring to FIG. 4C, at step 421, the front screen UI of the electronic device (100) is provided. At step 422, the tiling management controller (182) partitions the display (190) of the electronic device (100) on the basis of the aspect ratio, or at step 423, on the basis of the touch size of the user. Further, at step 424, the tiling management controller (182) determines if the finger area of the user is less than the tile area. If the finger area of the user is not less than the tile area, then the tiling management controller (182) at step 425, merges the tiles based on the finger area determined followed by merging corresponding blocks of tiles (step 426). If the finger area of the user is less than the tile area, then the tiling management controller (182) does not merge the tiles. Therefore, the tiles are personalized to the user automatically as and when the user uses the electronic device (100), which enhances the ease of use and the user experience of the user according to one or more embodiments.

Figure 4D:
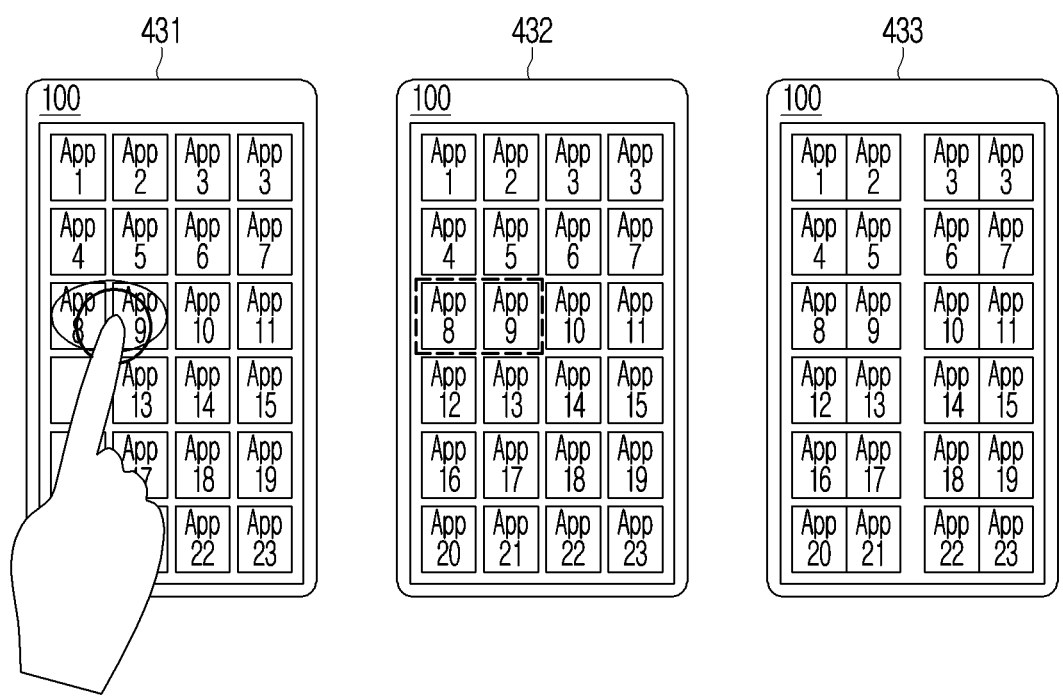
FIG. 4D illustrates an example of merging the tiles by the tiling management controller, according to an embodiment as disclosed herein.

FIG. 4D illustrates an example of merging the tiles by the tiling management controller (182), according to an embodiment as disclosed herein. In FIG. 4D in conjunction with the FIG. 4C, at step 431, the tiling management controller (182) determines the finger area of the user when the user accesses the actionable elements on the front UI, which is divided on the basis of the aspect ratio. At step 432, the tiling management controller (182) determines that the finger area of the user is greater than the tile area. Therefore, the tiling management controller (182) merges the tiles to form a single tile based on the finger area of the user, as step 433. The merging of the tiles provides better access of the actionable elements to the user and enhances user experience.

Figure 5A:
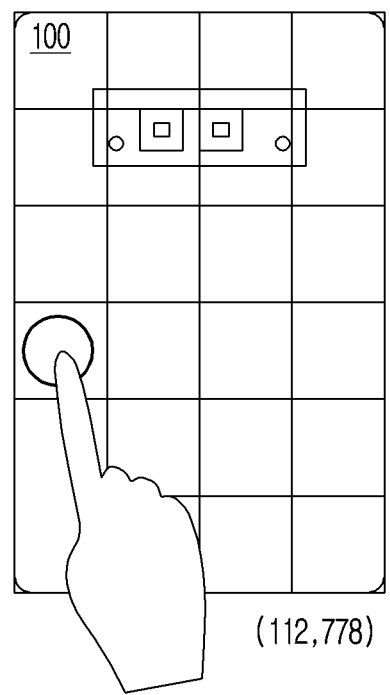
FIG. 5A illustrates examples of types of gestures performed on the rear end of the electronic device, according to an embodiment as disclosed herein.
Figure 5A:
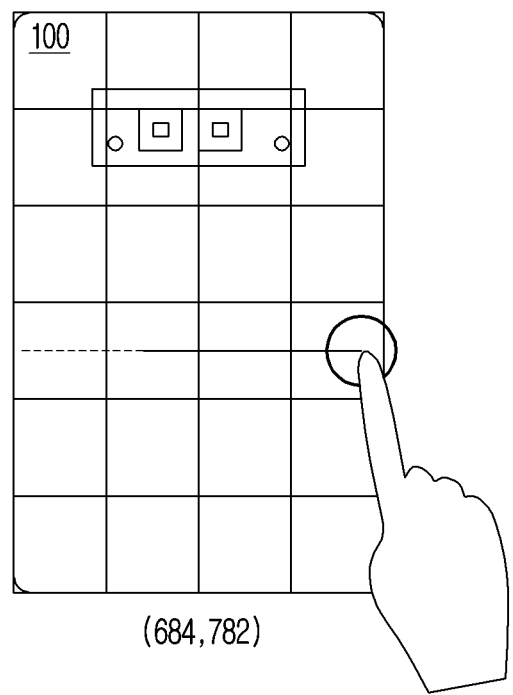

FIG. 5A illustrates examples of types of gestures performed on the rear end of the electronic device (100), according to an embodiment as disclosed herein. Referring to the FIG. 5A, at step 501, the user gesture used to provide input on the rear end of the electronic device (100) is single tap. Here the single tap will include specific coordinates. At step 502, the user gesture used to provide input on the rear end of the electronic device (100) is swipe. Here the swipe will include a series of consecutive coordinates as when the user swipes multiple tiles will be crossed by the user finger.

FIG. 5B illustrates an example of sample data for the touch coordinate detection controller (183), according to an embodiment as disclosed herein. The touch coordinate detection controller (183) receives inputs that include data from the accelerometer and the gyroscope, root value of each data from the accelerometer and the gyroscope, mean value of each piece of data from the accelerometer and the gyroscope, RMS value of each piece of data from the accelerometer and the gyroscope. The touch coordinate detection controller (183) determines the touch coordinates for various cases.

Figure 5C:
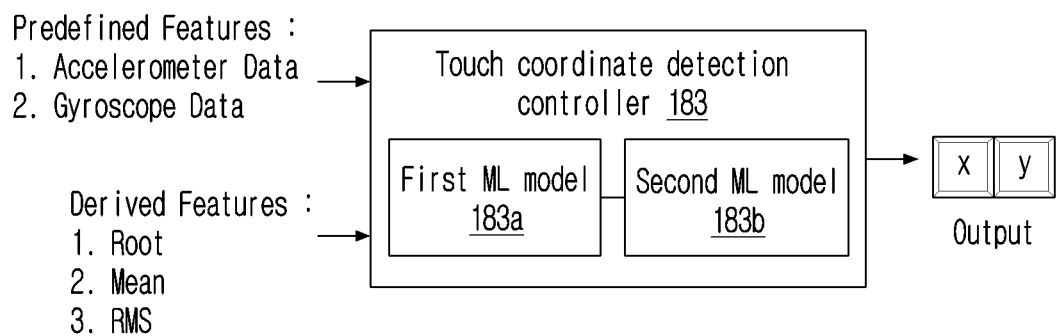
FIG. 5C illustrates an example of the touch coordinate detection controller of the electronic device, according to an embodiment as disclosed herein.

FIG. 5C illustrates an example using the touch coordinate detection controller (183) of the electronic device (100), according to an embodiment as disclosed herein. The touch coordinate detection controller (183) includes the first ML model (183a) and the second ML model (183b). The first ML model (183a) receives predefined features such as the accelerometer data and the gyroscope data, along with derived features such as root, mean, and RMS of each of the accelerometer data and the gyroscope data as inputs. The first ML model (183a) is, for example, a Random forest model and is configured to determine a quadrant of the input values. The second ML model (183b) then receives the quadrant of the input values and determines the exact coordinates. The second ML model (183b) can be, for example, Tensorflow Keras.

The data is taken for both true cases and false cases. For true cases the phone is held in a normal position, and the user swipes/taps in back panel; In this example, 1,000,000 readings have been taken. For false cases, the phone is used in all the positions where there is an invalid scroll/tap and when the user does not want the scroll/tap. 500,000 readings for cases also have been taken. The values obtained from the sensors are then operated, and new features derived from the dataset to enhance the accuracy.

Figure 5D:
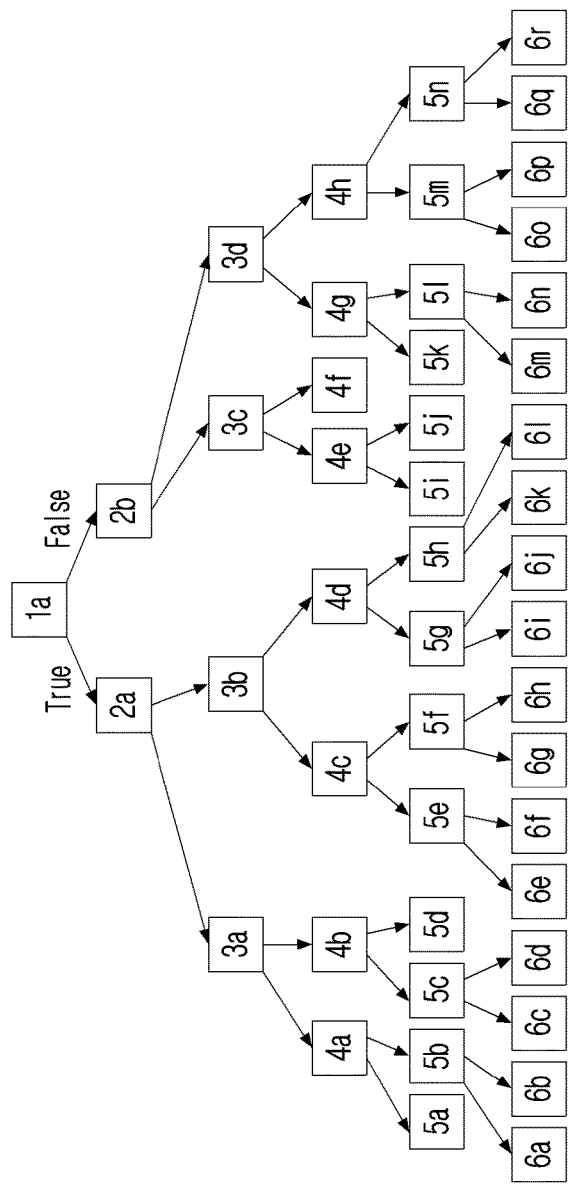
FIG. 5D illustrates an example decision tree for determining a quadrant by a first ML model, according to an embodiment as disclosed herein.
Figure 5D:
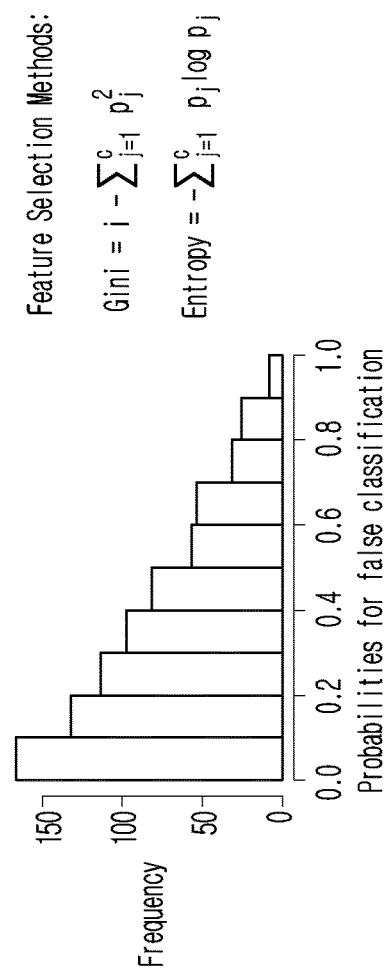
Figure 5D:
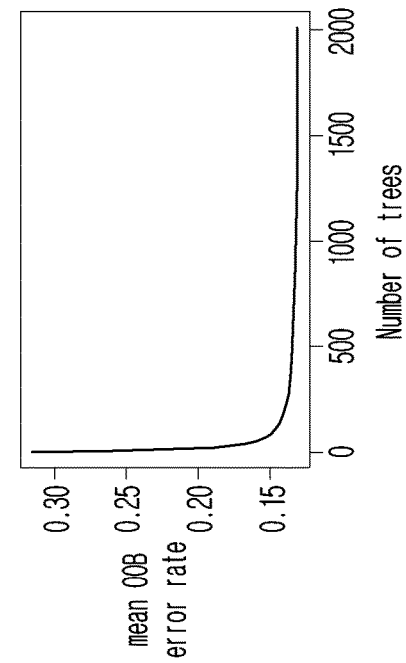

FIG. 5D will be described based on the following table 1.

TABLE 1

|   | 1 | 2 | 3 | 4 | 5 | 6 |
|---|---|---|---|---|---|---|
| a | gy ≤ 0.126<br>gini = 0.75<br>samples = 770<br>value = [191, 190, 185, 204]<br>class = BL | gy ≤ 0.116<br>gini = 0.742<br>samples = 658<br>value = [174, 185, 185, 114]<br>class = TL | gz ≤ −0.016<br>gini = 0.335<br>samples = 91<br>value = [13, 3, 2, 73]<br>class = BL | az ≤ −0.382<br>gini = 0.544<br>samples = 13<br>value = [8, 3, 0, 2]<br>class = TR | gini = 0.0<br>samples = 3<br>value = [0, 3, 0, 0]<br>class = TL | gini = 0.444<br>samples = 3<br>value = [1, 0, 0, 2]<br>class = BL |
| b |   | gx ≤ −0.02<br>gini = 0.329<br>samples = 112<br>value = [17, 5, 0, 90]<br>class = BL | ay ≤ −0.171<br>gini = 0.707<br>samples = 567<br>value = [161, 182, 183, 41]<br>class = BR | gx ≤ 0.033<br>gini = 0.167<br>samples = 78<br>value = [5, 0, 2, 71]<br>class = BL | gy ≤ −0.206<br>gini = 0.32<br>samples = 10<br>value = [8, 0, 0, 2]<br>class = TR | gini = 0.0<br>samples = 7<br>value = [7, 0, 0, 0]<br>class = TR |
| c |   |   | gy ≤ 0.19<br>gini = 0.444<br>samples = 6<br>value = [4, 2, 0, 0]<br>class = TR | ax ≤ −0.073<br>gini = 0.54<br>samples = 83<br>value = [53, 15, 11, 4]<br>class = TR | az ≤ −0.394<br>gini = 0.102<br>samples = 75<br>value = [2, 0, 2, 71]<br>class = BL | gini = 0.0<br>samples = 2<br>value = [2, 0, 0, 0]<br>class = TR |
| d |   |   | gz ≤ 0.025<br>gini = 0.263<br>samples = 106<br>value = [13, 3, 0, 90]<br>class = TR | ay ≤ 0.128<br>gini = 0.699<br>samples = 484<br>value = [108, 167, 172, 37]<br>class = BR | gini = 0.0<br>samples = 3<br>value = [3, 0, 0, 0]<br>class = TR | gini = 0.053<br>samples = 73<br>value = [0, 0, 2, 71]<br>class = BL |
| e |   |   |   | ay ≤ −0.077<br>gini = 0.444<br>samples = 3<br>value = [1, 2, 0, 0]<br>class = TL | ay ≤ −0.247<br>gini = 0.636<br>samples = 18<br>value = [2, 8, 7, 1]<br>class = TL | gini = 0.245<br>samples = 7<br>value = [1, 6, 0, 0]<br>class = TL |

TABLE 1-continued

| 1 | 2 | 3 | 4 | 5 | 6 |
|---|---|---|---|---|---|
| f |   |   |   | gini = 0.0<br>samples = 3<br>value = [3, 0, 0, 0]<br>class = TR | az ≤ −0.027<br>gini = 0.367<br>samples = 65<br>value = [51, 7, 4, 3]<br>class = TR | gini = 0.545<br>samples = 11<br>value = [1, 2, 7, 1]<br>class = BR |
| g |   |   |   | gz ≤ −0.074<br>gini = 0.175<br>samples = 95<br>value = [7, 2, 0, 86]<br>class = BL | gy ≤ −0.028<br>gini = 0.683<br>samples = 410<br>value = [68, 158, 150, 34]<br>class = TL | gini = 0.0<br>samples = 2<br>value = [0, 0, 0, 2]<br>class = BL |
| h |   |   |   | ax ≤ 0.018<br>gini = 0.562<br>samples = 11<br>value = [6, 1, 0, 4]<br>class = TR | gy ≤ 0.032<br>gini = 0.603<br>samples = 74<br>value = [40, 9, 22, 3]<br>class = TR | gini = 0.328<br>samples = 63<br>value = [51, 7, 4, 1]<br>class = TR |
| i |   |   |   |   | gini = 0.0<br>samples = 1<br>value = [1, 0, 0, 0]<br>class = TR | gini = 0.66<br>samples = 133<br>value = [31, 66, 23, 13]<br>class = TL |
| j |   |   |   |   | gini = 0.0<br>samples = 2<br>value = [0, 2, 0, 0]<br>class = TL | gini = 0.656<br>samples = 277<br>value = [31, 95, 127, 21]<br>class = BR |
| k |   |   |   |   | gini = 0.0<br>samples = 2<br>value = [2, 0, 0, 0]<br>class = TR | gini = 0.533<br>samples = 67<br>value = [40, 3, 22, 2]<br>class = TR |
| l |   |   |   |   | ay ≤ −0.195<br>gini = 0.142<br>samples = 93<br>value = [5, 2, 0, 86]<br>class = BL | gini = 0.245<br>samples = 7<br>value = [0, 6, 0, 1]<br>class = TL |
| m |   |   |   |   | gx ≤ 0.16<br>gini = 0.375<br>samples = 4<br>value = [0, 1, 0, 3]<br>class = BL | gini = 0.0<br>samples = 1<br>value = [1, 0, 0, 0]<br>class = TR |
| n |   |   |   |   | ax ≤ 0.203<br>gini = 0.245<br>samples = 7<br>value = [6, 0, 0, 1]<br>class = TR | gini = 0.124<br>samples = 92<br>value = [4, 2, 0, 86]<br>class = BL |
| o |   |   |   |   |   | gini = 0.0<br>samples = 1<br>value = [0, 1, 0, 0]<br>class = TL |
| p |   |   |   |   |   | gini = 0.0<br>samples = 3<br>value = [0, 0, 0, 3]<br>class = BL |
| q |   |   |   |   |   | gini = 0.0<br>samples = 6<br>value = [6, 0, 0, 0]<br>class = TR |
| r |   |   |   |   |   | gini = 0.0<br>samples = 1<br>value = [0, 0, 0, 1]<br>class = BL |

FIG. 5D illustrates an example decision tree for determining the quadrant by the first ML model (183a), according to an embodiment as disclosed herein. Referring to FIG. 5D, the decision tree solution is provided. Accelerometer features includes ax, ay, az, gyroscope features include gx, gy, gz, and the decision factor is determined based on the decision tree. In the decision tree, the top left (TL) is the 1st Quadrant, the top right (TR) is the 2nd Quadrant, the bottom left (BL) is the 3rd Quadrant, and the bottom right (BR) is the 4th Quadrant.

Feature Selection Methods includes:

$$\text{Gini} = 1 - \Sigma_{j=1}^{c} p_j^2$$

$$\text{Entropy} = -\Sigma_{j=1}^{c} p_j^2 \log p_j$$

Figure 5E:
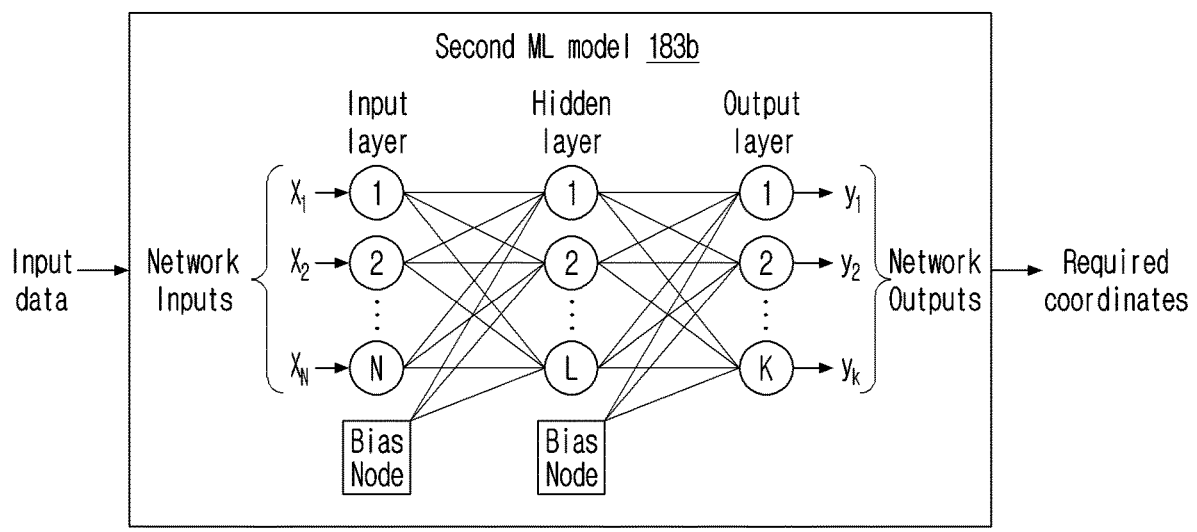
FIG. 5E illustrates the second ML model for determining touch coordinates of a gesture performed on the rear side of the electronic device, according to an embodiment as disclosed herein.

FIG. 5E illustrates the second ML model (183b) for determining the touch coordinates of the gesture performed on the rear side of the electronic device (100), according to an embodiment as disclosed herein. Referring to the FIG. 5E, the second ML model (183b) outputs the probability of a true case having the coordinates required. The Neural Net Dense Sequential Model may be used for the second ML model (183b). Here, the number of features (N) is 15, number of hidden layer=3, L=32, 16 and 8, K=Number of coordinates block.

The second ML model (183b) is TensorFlow's Keras sequential model used with dense layers. Input shape is (15, 1) and output shape is (K, 1) where K is the number of coordinate blocks taken. Further, 3 dense layers are also added for obtaining unidentified features. The Model optimizer used is Adam Optimizer with Sparse Categorical Cross entropy loss and accuracy metrics. Adam is an optimization technique used instead of the classical stochastic gradient descent procedure to iteratively update network weights while performing training with training data.

Figure 5F:
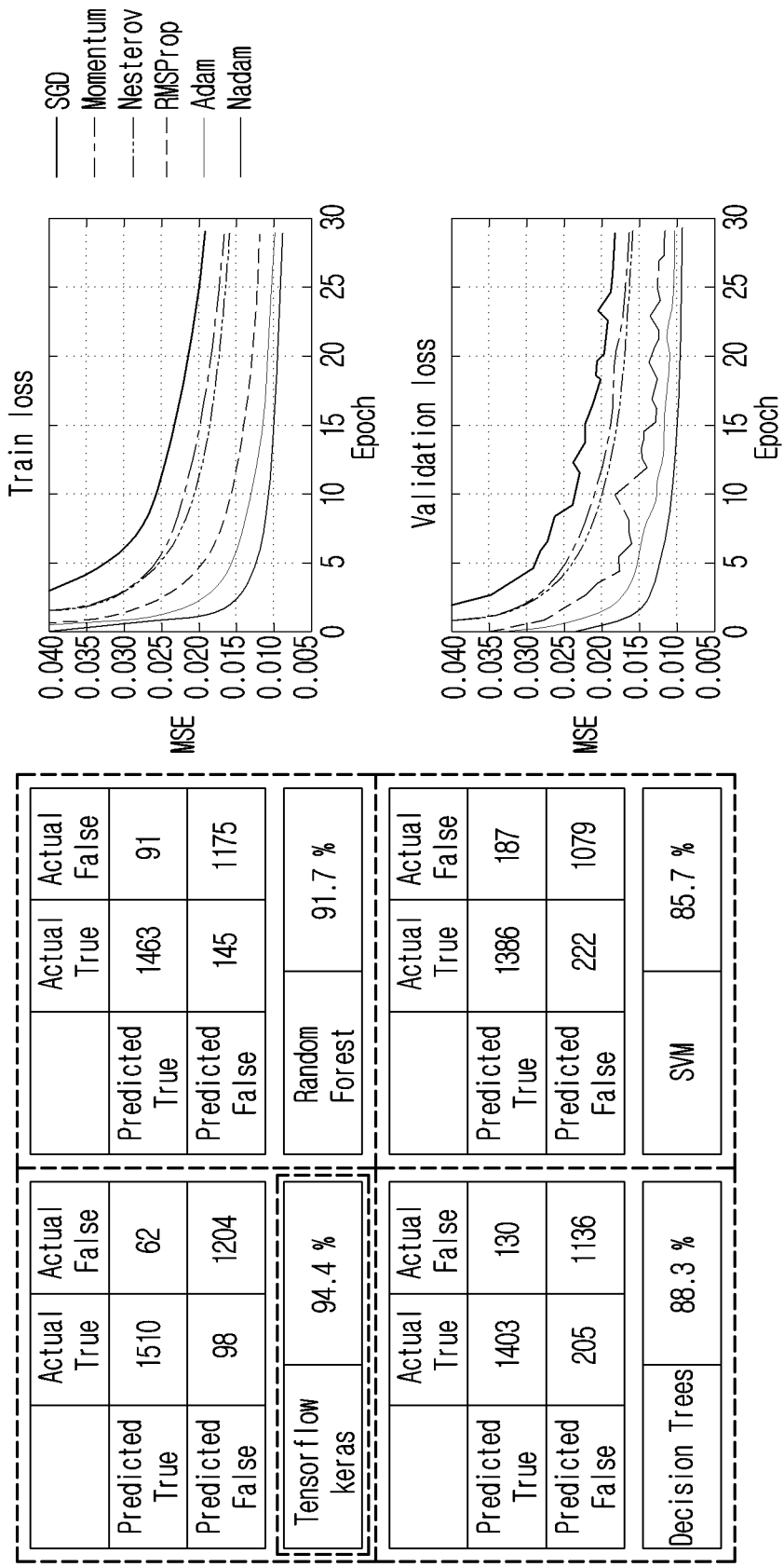
FIG. 5F illustrates a comparison of various models based on an accuracy for the second ML model for determining the touch coordinates of the gesture performed on the rear side of the electronic device, according to an embodiment as disclosed herein.

FIG. 5F illustrates a comparison of various models based on accuracy for the second ML model (183b) for determining the touch coordinates of the gesture performed on the rear side of the electronic device (100), according to an embodiment as disclosed herein. Referring to FIG. 5F, the comparison of various models for use as the second ML model (183b) is provided. The models were tested in 2874 data out of which 1608 are actual true cases and 1266 are actual false cases. Here, the results are compared using a confusion matrix and accuracy. The tensor flow keras model has given the best result and hence this model is used in the electronic device (100), although other models may be utilized. The comparison of different optimizers was also performed, and the Adam optimizer was chosen because of the best results, although other optimizers may be utilized.

FIG. 6A illustrates a sample data set for the gesture classification controller (184) for classifying the gesture performed on the rear side of the electronic device (100), according to an embodiment as disclosed herein. Referring to the FIG. 6A, the data input to the gesture classification controller (184) includes the touch coordinates along with the timestamp. The gesture classification controller (184) determines the category of the gesture as one of a single tap, a long tap, a swipe, triple finger touch, etc.

Figure 6B:
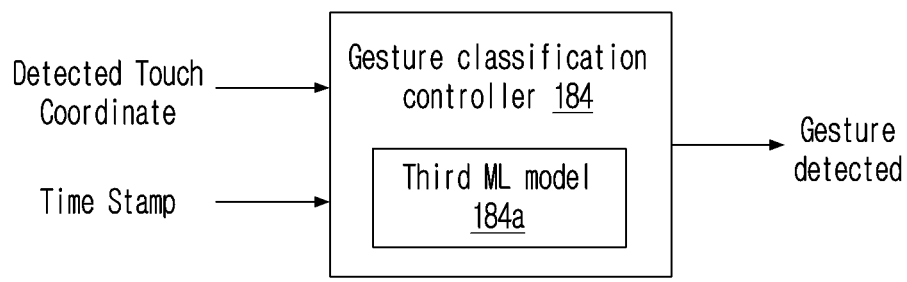
FIG. 6B illustrates a gesture classification controller classifying the detected gesture into a gesture category, according to an embodiment as disclosed herein.

FIG. 6B illustrates the gesture classification controller (184) classifying the detected gesture into the gesture category, according to an embodiment as disclosed herein. Referring to FIG. 6B, the gesture classification controller (184) includes the third ML model (184a). Once the touch coordinates are detected, the trained third ML model (184a) distinguishes between different types of gestures. The gesture supported here is single tap, long tap, scroll and tap with two fingers.

Figure 6C:
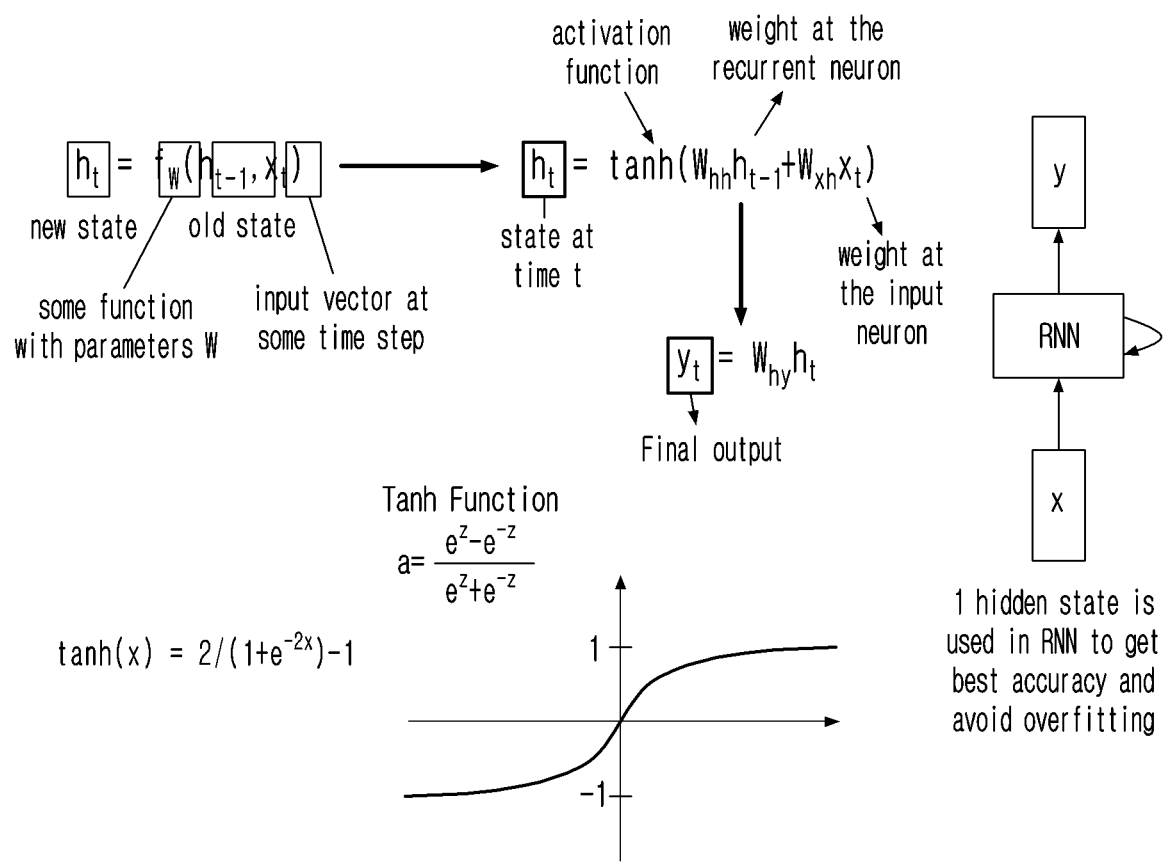
FIG. 6C illustrates an example operation of a third ML model, according to an embodiment as disclosed herein.

FIG. 6C illustrates an example using the third ML model (184a), according to an embodiment as disclosed herein. Referring to the FIG. 6C, a sequence of touch coordinates at different timestamps are provided as input to the third ML model (184a) one at a time. The third ML model (184a) is a Recurrent Neural Network. The RNN includes 1 hidden state to get best accuracy and avoid over fitting, although more than 1 hidden state may be utilized.

Figure 6D:
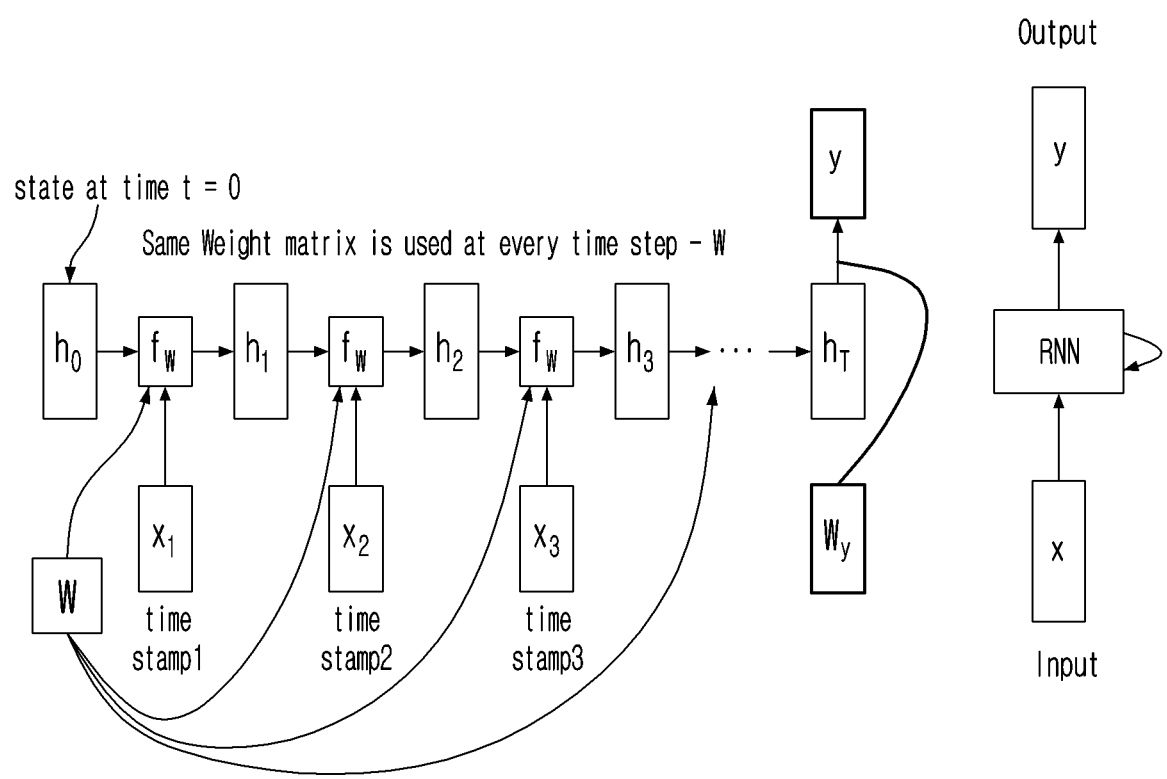
FIG. 6D illustrates computation graph visualization of the third ML model, according to an embodiment as disclosed herein.

FIG. 6D illustrates computation graph visualization of the third ML model (184a), according to an embodiment as disclosed herein. Referring to the FIG. 6D, a same weight matrix (W) is used at every time step. The weights are trained to the third ML model (184a) using BackPropagation.

Figure 7A:
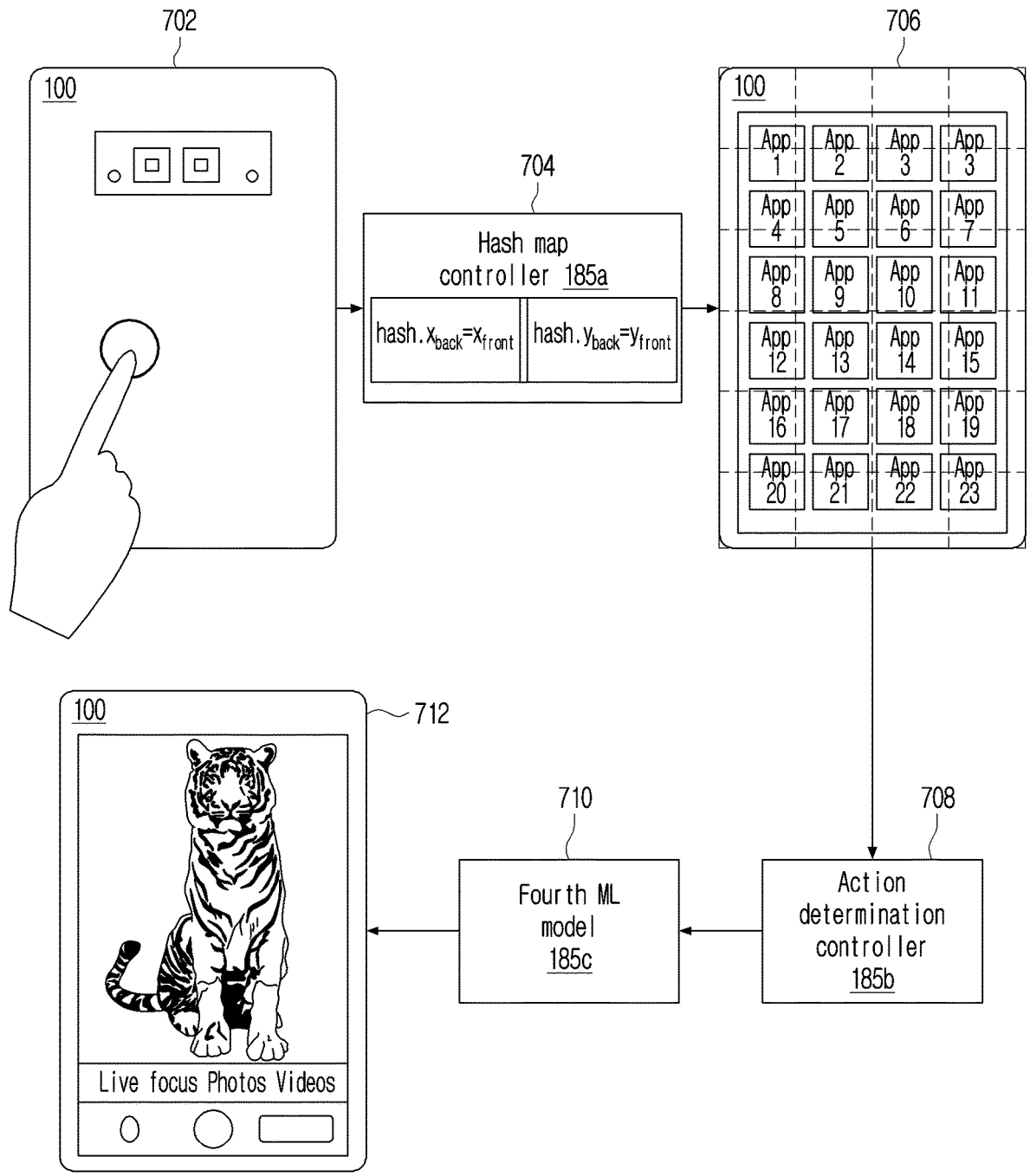
FIG. 7A illustrates the method for automatically executing a functionality on the electronic device, according to an embodiment as disclosed herein.

FIG. 7A illustrates the method for automatically executing the functionality on the electronic device (100), according to an embodiment as disclosed herein. Referring to FIG. 7A, at step 702, the electronic device (100) determines the back touch coordinates of the user gesture provided on the rear side of the electronic device (100). At step 704, the hash map function maps the back coordinates to the front screen coordinates. At step 706, the electronic device (100) identifies the front touch coordinates corresponding to the back coordinates based on the hash map.

Further, at step 708, the action determination controller (185b) is configured to receive the tile hashmap, the key, and values (tile start and end coordinates, tile number, and list of applications). Based on the inputs, the action determination controller (185b) determines the list of actions for that particular tile such as, for example, an email application, a camera application, settings application, etc. At step 710, the fourth ML model (185c) is a trained model to determine that there are more than one action determined based on the user touch, and hence the multiple actions need to be prioritized to execute the action with the highest priority. In the example, consider that the camera application has the highest priority of the email application, the camera application, and the settings application. Accordingly, the fourth ML model (185c) determines and executes the camera application (as indicated in the step 712).

Figure 7B:
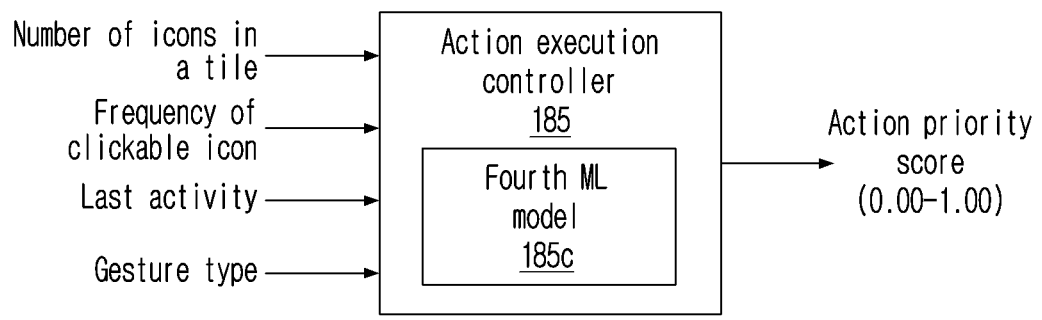
FIG. 7B illustrates a block diagram of a fourth ML model of an action execution controller for action prioritization, according to an embodiment as disclosed herein.
Figure 7D:
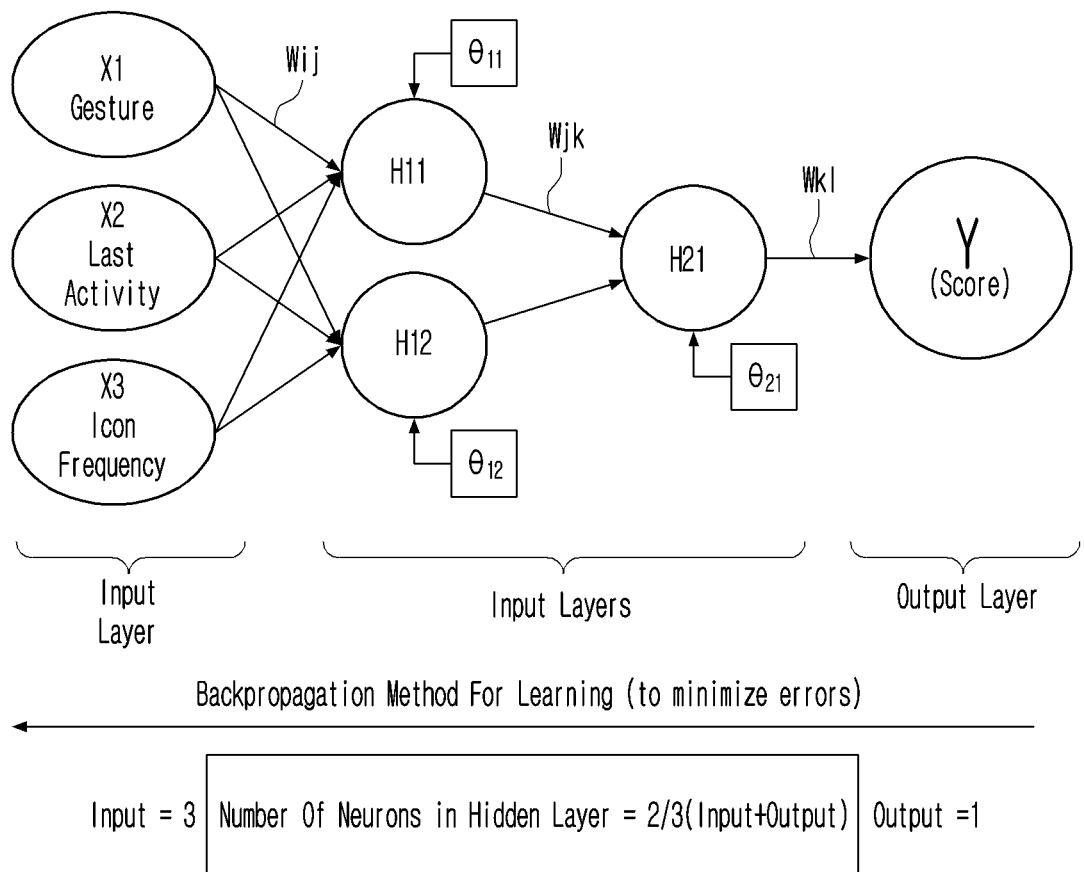
FIG. 7D illustrates various layers of the fourth ML model, according to an embodiment as disclosed herein.

FIG. 7B illustrates a block diagram of the fourth ML model (185c) of the action execution controller (185) for action prioritization, according to an embodiment as disclosed herein. FIG. 7C illustrates sample data for determining the priority score for each of the plurality of functionality to be performed on the display (190) using the fourth ML model (185c), according to an embodiment as disclosed herein. FIG. 7D will be described based on the following equation. FIG. 7D illustrates various layers of the fourth ML model (185c), according to an embodiment as disclosed herein.

Output of $j^{th}$ Node of Input Layer $$O_j = I_j$$

Input of $j^{th}$ Node of Hidden/Output Layer $$I_j = \Sigma_i w_{ij} O_i + \theta_j$$

Output of $j^{th}$ Node of Hidden/Output Layer $$O_j = \frac{1}{1 + e^{-I_j}}$$

Error of $j^{th}$ Node of Output Layer $$Err_j = O_j(1-O_j)(T_j-O_j)$$

Error of $j^{th}$ Node of Hidden Layer $$Err_j = O_j(1-O_j)\Sigma_k Err_k w_{jk}$$

Adjustment of Bias & Weights $$\theta_j = \theta_j + (l)Err_j$$

$$w_{ij} = w_{ij} + (l)Err_j O_i$$

Referring to the FIG. 7B, the fourth ML model (185c) receives inputs as a plurality of actionable elements within the tile area, a frequency of usage of the actionable elements, a last activity on the electronic device (100), and the gesture category of the at least one gesture. The fourth ML model (185c) determines the action priority score between (0.00-1.00) for each of the plurality of functionalities to be performed on the display (190). Therefore, based on the priority score, the functionality/action with the highest priority score is executed. FIG. 7C indicates the sample dataset for the action prioritization by the fourth ML model (185c).

Figure 8:
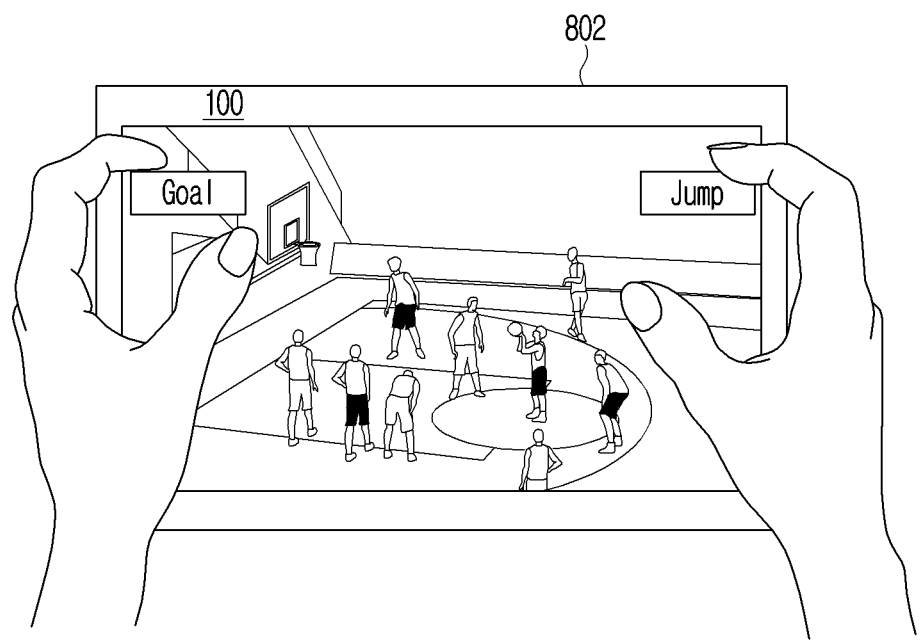
FIG. 8 is an example illustrating use of the rear side control functionality of the electronic device for a small display, according to an embodiment as disclosed herein.
Figure 8:
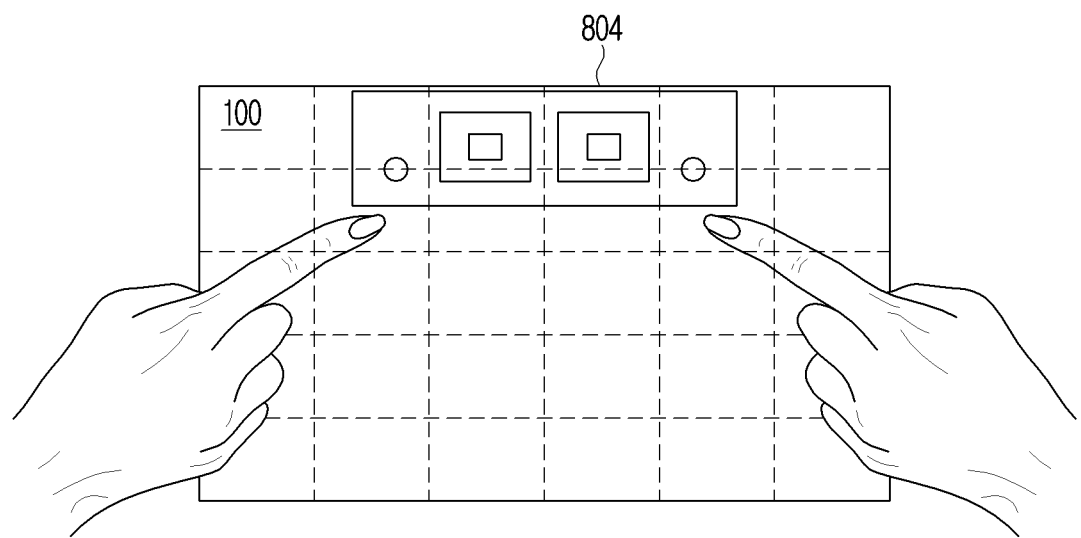

FIG. 8 is an example illustrating use of the rear side control functionality of the electronic device (100) for a small display (190), according to an embodiment as disclosed herein. Referring to FIG. 8, at step 802, consider a scenario where the size of the display (190) is small and comprises multiple control buttons on the display (190) such as goal, jump, movement, etc., particularly in a gaming application. The user has to use two fingers and two thumbs, which reduces the visibility of the display (190). This creates difficulty in interacting with the display (190) and thereby degradation of the user experience.

At step 804, in according with one or more embodiments, the electronic device (100) enables the rear side control functionality. As a result, the user can use the two fingers to control the electronic device (100) from rear side of the electronic device (100), which enhances the user experience especially during gaming and reduces the interaction with the electronic device (100) (on the front side of the display (190)).

Figure 9:
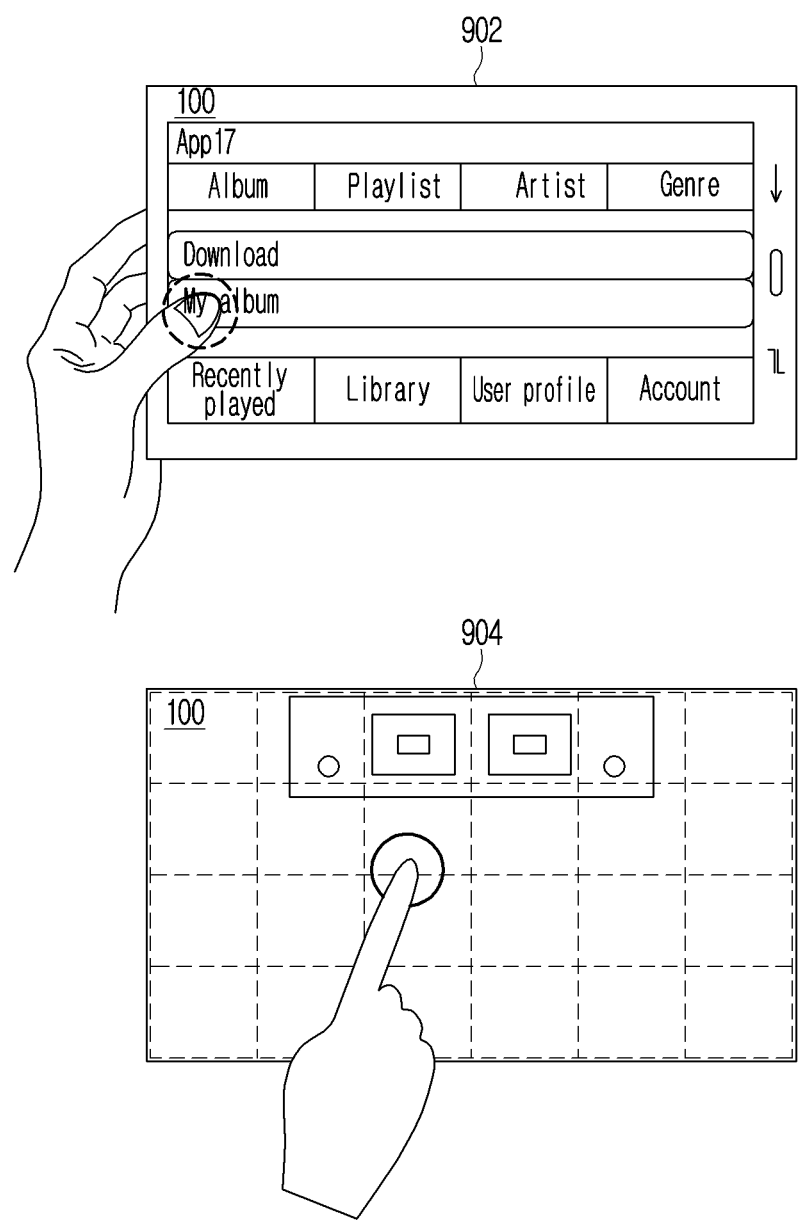
FIG. 9 is an example illustrating use of the rear side control functionality of the electronic device for a large display, according to an embodiment as disclosed herein.

FIG. 9 is an example illustrating use of the rear side control functionality of the electronic device (100) for a large display (190), according to an embodiment as disclosed herein. Referring to FIG. 9, at step 902, consider that a size of the display (190) is very large and therefore the user finds it difficult to hold the electronic device (100) and simultaneously provide the gestures. As a result, the operation requires higher response time and degrades the user experience. In accordance with one or more embodiments, the rear side control functionality of the electronic device (100) can be enabled to help the user better access the electronic device (100) using click actions without finger movement as step 904. Therefore, this reduces the response time and enhances the user experience, according to one or more embodiments.

Figure 10:
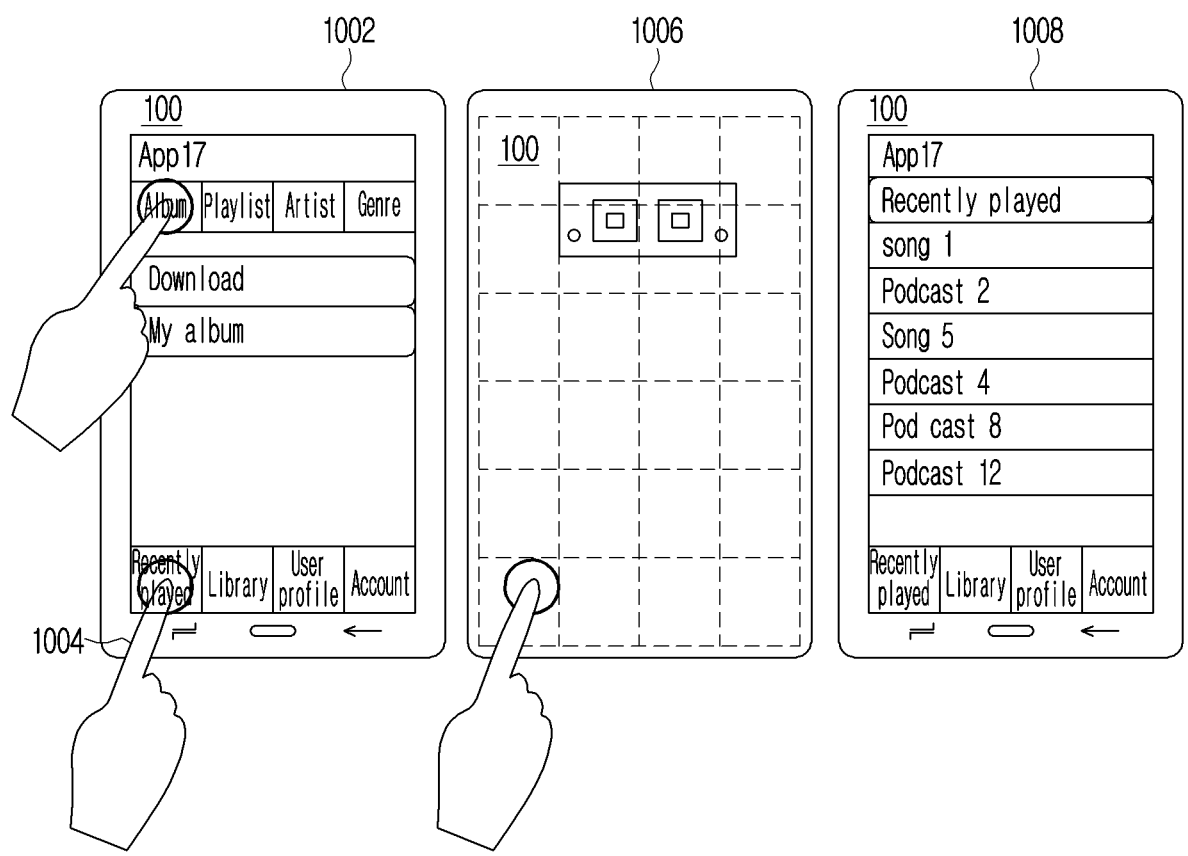
FIG. 10 is an example illustrating use of the rear side control functionality of the electronic device during non-responsiveness of a specific portion of the display, according to an embodiment as disclosed herein.

FIG. 10 is an example illustrating use of the rear side control functionality of the electronic device (100) during non-responsiveness of a specific portion of the display (190), according to an embodiment as disclosed herein. Referring to FIG. 10, at step 1002 consider that the user is attempting to access an option within a music application by providing the input on the display (190) and is successful in accessing the same. At step 1004, the user is attempting to access another option on the same window but is not able to because of the non-responsiveness of the specific portion of the display (190). This will lead to difficulty in accessing specific options of the music application.

In accordance with one or more embodiments, at step 1006, the electronic device (100) on determining that the specific portion of the display (190) is non-responsive, enables the rear side control functionality of the electronic device (100). As a result, the user can provide the input on the rear side of the electronic device (100) to select the option that is located in the non-responsive portion of the display (190). Therefore, this enables easy access even when a portion of the display (190) is non-responsive rather than forcing the user to discard the electronic device (100), according to one or more embodiments.

Figure 11:
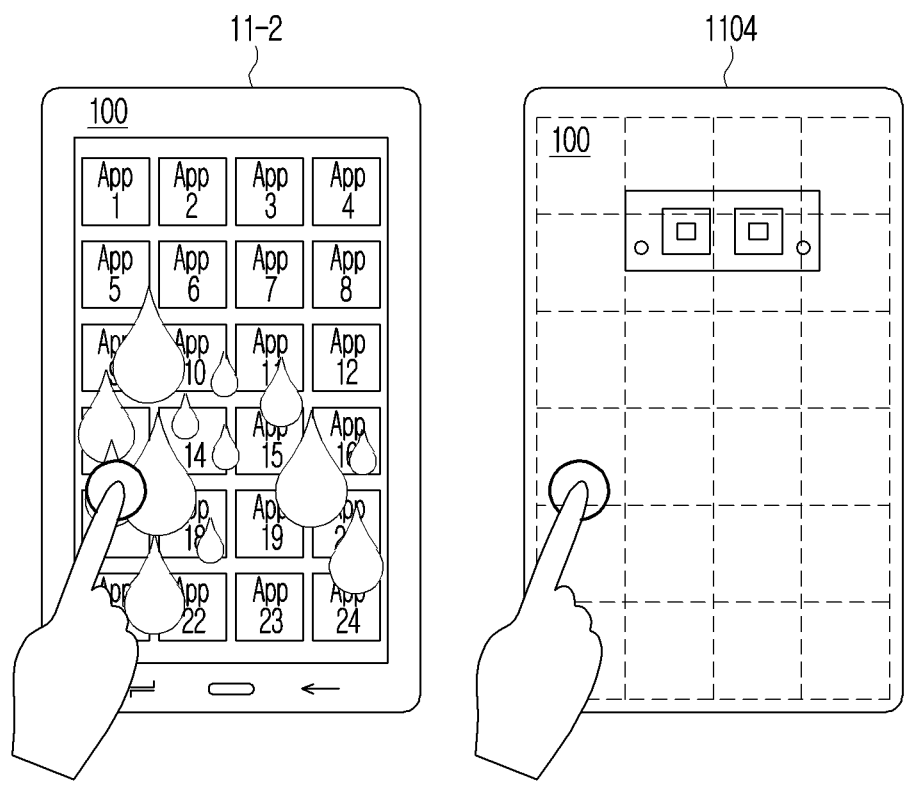
FIG. 11 is an example illustrating use of the rear side control functionality of the electronic device during no capacitance change due to rain, according to an embodiment as disclosed herein.

FIG. 11 is an example illustrating use of the rear side control functionality of the electronic device (100) during no capacitance change because of rain (or water in general), according to an embodiment as disclosed herein. Referring to FIG. 11, at step 1102, consider a scenario where the user is attempting to launch an application in the electronic device (100) during rain or a underwater sport and/or during any condition having water cover the display (190). The capacitance does not change when there is moisture content on the display (190) of the electronic device (100). As a result, the display (190) does not recognize the input provided by the user when there is water on the display (190).

Unlike conventional methods and systems, one or more embodiments automatically enable the rear side of the electronic device (100) based on determining that the display (190) is non-responsive to the user input. Further, the user can provide the user input on the rear side of the electronic device (100) (e.g., opposite the specific location of the front side of the electronic device) to correspondingly perform actions on the display (190). Since the control functionality on the rear side of the electronic device (100) is not based on capacitance change, the user can use the rear side during rain or underwater sports.

Figure 12:
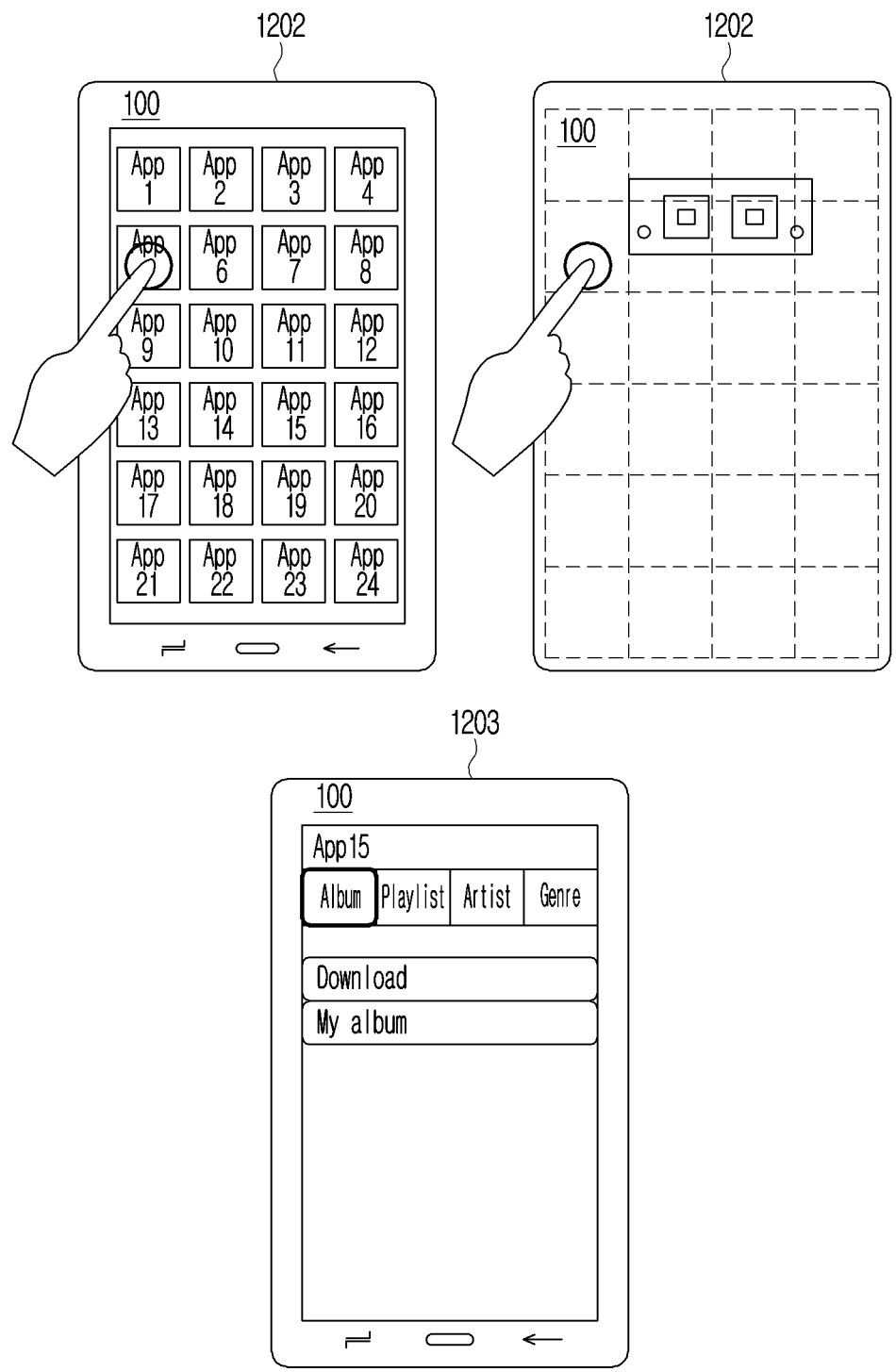
FIG. 12 is an example illustrating use of the rear side control functionality of the electronic device while wearing non-conductive accessories, according to an embodiment as disclosed herein.

FIG. 12 is an example illustrating use of the rear side control functionality of the electronic device (100) while wearing non-conductive accessories, according to an embodiment as disclosed herein. Referring to FIG. 12, at step 1202, consider a user such as a doctor or a sanitation worker who is accessing the electronic device (100) while wearing a non-conductive accessory such as gloves. The display (190) is non-responsive to the touch/gesture of the user as the gloves are non-conductive, and as a result the user finds it difficult to interact with the electronic device (100). In accordance with one or more embodiments, the rear side of the electronic device (100) is partitioned into multiple dynamic tiles based on multiple parameters associated with the display (190) of the electronic device (100). At step 1204, the user can instead provide the touch/gesture on the rear side of the electronic device (100), which is mapped to the display (190) of the electronic device (100). Therefore, at step 1206, the electronic device (100) launches the desired application on the display (190) of the electronic device (100), thereby providing a smooth device interaction and enhanced user experience even when the user is wearing the non-conductive accessory.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for providing control functionality of a display of an electronic device, the method comprising:
   determining, by the electronic device, a non-responsiveness of the display on a front side of the electronic device as an event associated with the display of the electronic device;
   in response to determining the non-responsiveness of the display on the front side of the electronic device, partitioning, by the electronic device, a rear side of the electronic device into a plurality of dynamic tiles based on a plurality of parameters associated with the display of the electronic device, in response to determining the event, wherein the rear side is opposite the front side;
   detecting, by the electronic device, at least one gesture on at least one dynamic tile of the plurality of dynamic tiles on the rear side of the electronic device;
   classifying, by the electronic device, the at least one gesture into a gesture category;
   determining, by the electronic device, at least one functionality to be performed on the display based on the at least one gesture on the rear side of the electronic device and the gesture category; and
   controlling, by the electronic device, the at least one functionality on the display of the electronic device.

2. The method as claimed in claim 1, wherein the event associated the display of the electronic device further comprises a reduction in user experience during interaction with the display of the electronic device.

3. The method as claimed in claim 1, wherein the plurality of parameters associated with the display of the electronic device comprises at least one of an aspect ratio of the electronic device, a user touch area, or a sensor location and proximity of at least one actionable element with respect to other actionable elements on the display of the electronic device.

4. The method as claimed in claim 2, wherein the non-responsiveness of the display of the electronic device is detected based on one of a capacitance change of the display, a temperature of the electronic device, or a ghost touch on the display of the electronic device.

5. The method as claimed in claim 2 wherein the reduction in the user experience during interaction with the display of the electronic device is determined based on at least one of a size of the display, a number of actionable elements on the display, and a distribution pattern of the number of the actionable elements on the display.

6. The method as claimed in claim 1, wherein the gesture category comprises one of a single tap, a double tap, a long tap, a triple tap, a scroll with a single finger, a scroll with double fingers, and a horizontal swipe.

7. The method as claimed in claim 1, wherein partitioning, by the electronic device, the rear side of the electronic device into the plurality of dynamic tiles based on the plurality of parameters associated with the display of the electronic device, in response to determining the event comprises:
   dividing, by the electronic device, the rear side of the electronic device into the plurality of dynamic tiles based on an aspect ratio of the electronic device;
   dividing, by the electronic device, a front side of the electronic device into a first set of blocks based on pixel coordinates, wherein each block of the first set of blocks comprises a block area;
   determining, by the electronic device, a touch area of a user on the display of the electronic device;
   determining, by the electronic device, that the touch area on the display is greater than the block area of each block of the first set of blocks;
   merging, by the electronic device, at least two blocks of the first set of blocks to form a second set of blocks based on one of the touch area and a position of actionable elements on the front side of the electronic device;
   determining, by the electronic device, a pattern of sensor features and coordinate values of each of the plurality of dynamic tiles on the rear side of the electronic device;
   mapping, by the electronic device, the coordinate values of each of the plurality of dynamic tiles on the rear side of the electronic device to corresponding ones of the second set of blocks on the front side of the electronic device; and
   partitioning, by the electronic device, the rear side of the electronic device into the plurality of dynamic tiles based on the mapping.

8. The method as claimed in claim 1, wherein classifying, by the electronic device, the at least one gesture into the gesture category comprises:
   detecting, by the electronic device, at least one touch coordinate associated with the at least one gesture on the rear side of the electronic device;
   determining, by the electronic device, a time stamp of the at least one touch coordinate associated with the at least one gesture;
   inputting, by the electronic device, the at least one touch coordinate associated with the at least one gesture and the time stamp of the at least one touch coordinate associated with the at least one gesture to a third machine learning (ML) model; and
   classifying, by the electronic device, the at least one gesture into the gesture category using the third ML model.

9. The method as claimed in claim 1, wherein determining, by the electronic device, the at least one functionality to be performed on the display based on the at least one gesture on the rear side of the electronic device and the gesture category comprises:
   mapping, by the electronic device, coordinates associated with the at least one gesture on the rear side of the electronic device and the gesture category into a second set of blocks on the front side of the electronic device, wherein the mapping comprises a start coordinate and an end coordinate of at least one tile of the plurality of dynamic tiles, a tile number, and a list of applications within a tile area of the at least one tile; and
   determining, by the electronic device, the at least one functionality to be performed on the display based on the mapping.

10. The method as claimed in claim 9, further comprising:
   determining, by the electronic device, a plurality of functionalities to be performed on the display based on the at least one gesture on the rear side of the electronic device;

inputting, by the electronic device, actionable elements within the tile area, a frequency of usage of the actionable elements, a last activity on the electronic device, and the gesture category of the at least one gesture to a fourth ML model; and determining, by the electronic device, a priority score for each of the plurality of functionalities to be performed on the display using the fourth ML model.

11. The method as claimed in claim 10, further comprising:

storing, by the electronic device, the at least one gesture, the gesture category, and the priority score for each of the plurality of functionalities to be performed on the display;

determining, by the electronic device, the at least one gesture on the rear side of the electronic device for performing the plurality of functionalities; and automatically determining, by the electronic device, the at least one functionality to be performed based on the priority score for each of the plurality of functionalities.

12. The method as claimed in claim 1, wherein detecting, by the electronic device, the at least one gesture on the at least one dynamic tile on the rear side of the electronic device comprises:

inputting, by the electronic device, predefined features and derived features associated with the at least one gesture to a first ML model;

determining, by the electronic device, a quadrant of a set of four quadrants of the at least one gesture by the first ML model;

inputting, by the electronic device, the quadrant of the at least one gesture into a second ML model, wherein the second ML model is a TensorFlow's Keras sequential model;

determining, by the electronic device, coordinates of the at least one gesture by the second ML model; and detecting, by the electronic device, the at least one gesture on the at least one dynamic tile on the rear side of the electronic device based on coordinates of the at least one gesture.

13. An electronic device for providing control functionality of a display, the electronic device comprising:

a memory;

a processor coupled to the memory;

a communicator coupled to the memory and the processor;

a touch management controller coupled to the memory, the processor, and the communicator, the touch management controller being configured to:

determine a non-responsiveness of the display on a front side of the electronic device as an event associated with the display of the electronic device;

in response to determining the non-responsiveness of the display on the front side of the electronic device, partition a rear side of the electronic device into plurality of dynamic tiles based on a plurality of parameters associated with the display of the electronic device, in response to determining the event, wherein the rear side is opposite the front side;

detect at least one gesture on at least one dynamic tile of the plurality of dynamic tiles on the rear side of the electronic device;

classify the at least one gesture into a gesture category;

determine at least one functionality to be performed on the display based on the at least one gesture on the rear side of the electronic device and the gesture category; and control the at least one functionality on the display of the electronic device.

14. The electronic device as claimed in claim 13, wherein the event associated the display of the electronic device further comprises a reduction in user experience during interaction with the display of the electronic device.

15. The electronic device as claimed in claim 14, wherein the plurality of parameters associated with the display of the electronic device comprises at least one of an aspect ratio of the electronic device, a user touch area, a sensor location and proximity of at least one actionable element with respect to other actionable elements on the display of the electronic device.

* * * * *